US012362907B2

(12) United States Patent
Lin et al.

(10) Patent No.: US 12,362,907 B2
(45) Date of Patent: Jul. 15, 2025

(54) FORMAT-PRESERVING DATA ENCRYPTION

(71) Applicant: Fortanix, Inc., Mountain View, CA (US)

(72) Inventors: Xinyu Lin, San Jose, CA (US); Jethro Gideon Beekman, Eindhoven (NL); Jeffrey Seyfried, Cupertino, CA (US)

(73) Assignee: Fortanix, Inc., Santa Clara, CA (US)

( * ) Notice: Subject to any disclaimer, the term of this patent is extended or adjusted under 35 U.S.C. 154(b) by 364 days.

(21) Appl. No.: 17/750,124

(22) Filed: May 20, 2022

(65) Prior Publication Data

US 2023/0379138 A1    Nov. 23, 2023

(51) Int. Cl.
*H04L 9/06* (2006.01)

(52) U.S. Cl.
CPC ................. *H04L 9/0618* (2013.01)

(58) Field of Classification Search
CPC .................................................. H04L 9/0618
See application file for complete search history.

(56) References Cited

U.S. PATENT DOCUMENTS

| | | | | |
|---|---|---|---|---|
| 5,151,970 A * | 9/1992 | Engeler | ................. | G06N 3/04 |
| | | | | 708/801 |
| 5,473,556 A * | 12/1995 | Aguilar | ................. | G06F 7/768 |
| | | | | 708/404 |
| 9,313,023 B1 * | 4/2016 | Murray | ................. | H04L 9/14 |
| 10,148,424 B2 * | 12/2018 | Iyer | ................. | H04L 9/0618 |
| 11,630,997 B2 * | 4/2023 | Lee | ................. | G06N 3/045 |
| | | | | 706/22 |
| 2011/0002460 A1 * | 1/2011 | Michaels | ................. | H04L 9/001 |
| | | | | 380/37 |

(Continued)

FOREIGN PATENT DOCUMENTS

| JP | 2010257281 A | * | 11/2010 |
|---|---|---|---|
| KR | 20190089685 A | * | 7/2019 |

OTHER PUBLICATIONS

Dworkin, M, "Recommendation for Block Cipher Modes of Operation." Draft NIST Special Publication 800-38G Revision 1. 31 Pages.

*Primary Examiner* — John B King
*Assistant Examiner* — Alex D Carrasquillo
(74) *Attorney, Agent, or Firm* — Lowenstein Sandler LLP

(57) ABSTRACT

A method includes receiving input data that includes a plurality of input parts, wherein the input data corresponds to a data schema, wherein the data schema includes a plurality of schema parts, wherein each schema part specifies a set of one or more possible values, and wherein each input part satisfies a respective schema part. The method further includes generating an intermediate numeric value that represents the input data, generating, using a format-preserving encryption algorithm, an encrypted numeric value based on the intermediate numeric value, determining a number of possible values that satisfy the data schema, determining whether the encrypted numeric value satisfies a threshold criterion based on the number of possible values that satisfy the data schema, and responsive to determining that the encrypted numeric value satisfies the threshold criterion, generating, based on the encrypted numeric value, output data that conforms to the data schema.

19 Claims, 15 Drawing Sheets

(56) References Cited

U.S. PATENT DOCUMENTS

| | | | |
|---|---|---|---|
| 2011/0103579 A1* | 5/2011 | Martin | G06F 21/602 |
| | | | 714/E11.032 |
| 2014/0108813 A1* | 4/2014 | Pauker | H04L 9/0618 |
| | | | 713/189 |
| 2015/0358159 A1* | 12/2015 | Rozenberg | H04L 9/0618 |
| | | | 380/28 |
| 2019/0386814 A1* | 12/2019 | Ahmed | H04L 9/008 |
| 2022/0130282 A1* | 4/2022 | Balabine | G09C 1/00 |

* cited by examiner

FORMAT-PRESERVING DATA ENCRYPTION

TECHNICAL FIELD

Aspects of the present disclosure relate generally to security, and more specifically, relate to format-preserving encryption of data in complex data formats.

BACKGROUND

Encryption algorithms can provide data confidentiality by converting input data, referred to as "plaintext," to an encrypted representation referred to as "ciphertext." The ciphertext can be converted back to the plaintext using an encryption key, which can be provided to parties who are authorized to access the plaintext. An encryption algorithm can encrypt input data that is in a particular data format, such as a sequence of bytes, and produce another sequence of bytes as ciphertext. Data that is not in the particular data format accepted by the encryption algorithm can be converted to the particular data format prior to encryption. For example, a credit card number that is represented as a sequence of 16 numeric digits can be converted to a sequence of bytes for encryption. Since the encryption algorithm ordinarily generates ciphertext as a sequence of bytes (or a similar data format), the ciphertext is in a different format than the original data's credit card number format. Thus, the ciphertext may be incompatible with certain applications that expect data to be in the credit card format. Existing applications may represent data in particular formats, such as the 16-digit credit card format. When encryption is added to such applications, and the ciphertext does not conform to the expected format (e.g., the same data format as the plaintext), errors or other unexpected behavior can occur. For example, an application may attempt to validate and display an encrypted credit card number in the 16-digit credit card number format. However, the ciphertext generated by encrypting the 16-digit credit card number may be a sequence of bytes that does not necessarily represent a valid credit card number. For example, the ciphertext may have a different number of bytes than a 16-digit credit card number. Thus, the validation and display operations may fail because the ciphertext is incompatible with the 16-digit credit card number format.

Format-preserving data encryption addresses such compatibility issues by producing ciphertext having the same character set and length as the plaintext. The character set can be, for example, the set of Latin letters in the range A-Z, or the numeric digits 0-9. Thus, format-preserving encryption can encrypt plaintext such as "ABC" using an appropriate encryption key to form ciphertext, such as "ODV", in the same alphabet. The data format can also include a length, e.g., 16 numeric digits. Thus, as another example, format-preserving encryption can encrypt a 16-digit number to form ciphertext that is another 16-digit number. Format-preserving encryption can thus be used to add data encryption to existing applications for data that is in a single character set and has a specific length.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
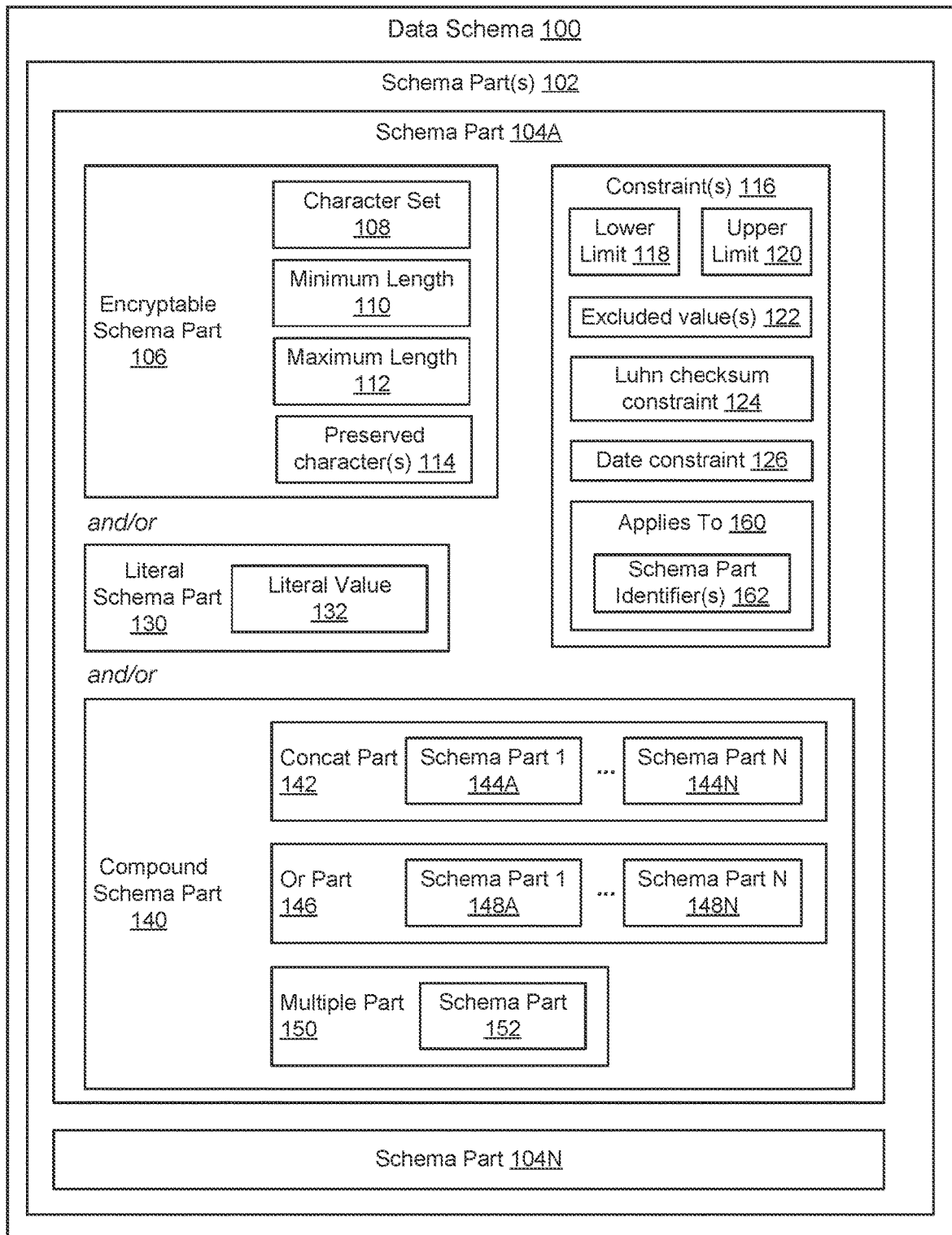
FIG. 1 illustrates an example data schema that can represent data formats in accordance with particular embodiments of the present disclosure.

Aspects of the present disclosure relate to format-preserving encryption of data in complex data formats that can include multiple parts. Each part can have one or more constraints, and different parts can have different constraints. In general, existing encryption techniques can encrypt data ("plaintext") in a format such as a sequence of byte values, and produce encrypted data ("ciphertext") that is also a sequence of byte values. Data in a particular format, such as a United States Social Security Number ("SSN") having 9 numeric characters, can be encrypted by transforming the data to a sequence of bytes and encrypting the sequence of bytes. However, since the resulting ciphertext is a sequence of bytes, it is unlikely to conform to the SSN format. This discrepancy can cause problems in application programs that expect the ciphertext to conform to the plaintext format. Application programs that do not provide encryption can be extended to encrypt data, but if the encrypted data does not conform to the format expected by the application, errors or incorrect results can occur. For example, if data items that are validated or otherwise processed by the application are encrypted, then errors can occur validating or processing the ciphertext.

"Simple data format" herein shall refer to a data format in which data values are composed of characters from a single character set. A character set can be a set or range of character values, e.g., 0-9, A-Z, or other specified set. Existing format-preserving encryption techniques can encrypt plaintext represented in a particular character set to form ciphertext represented in the same character set. For example, existing format-preserving encryption techniques can encrypt plaintext represented as a string of alphanumeric characters, such as the letters A through Z and numbers 0-9, and produce ciphertext that is also a string of alphanumeric characters. However, existing format preserving encryption techniques do not preserve formats that includes multiple parts, each of which can have different constraints. A constraint can include, e.g., a set of allowed characters, a particular length in characters, or a range of allowed multi-character values. For example, existing format-preserving encryption techniques do not preserve a date format that specifies a month, day, and year, with different constraints on the month, day, and year. The date constraints can be, for example, that the maximum value of the day is dependent on the month, the month is between 1 and 12, and the year is four characters in length. As another example, existing format-preserving encryption techniques do not preserve the SSN format described above, because the SSN format has multiple parts, each of which has a different set of constraints.

Aspects of the present disclosure address the above and other deficiencies by providing a format-preserving encryption system that can encrypt plaintext data conforming to a complex data format and produce encrypted data conforming to the same complex data format. "Complex data format" herein shall refer to a data format in which a conforming data value is composed of two or more data parts, and each data part is composed of one or more characters from a corresponding character set. A complex data format can also include constraints on one or more of the data parts, such lengths of respective data parts. A complex data format can be represented by a format specification, which can include two or more part formats, each of which can specify a different constraint on values of a corresponding data part. The part formats can be represented using a data format description language, schema, or other representation. For example, a data format description language representation can be converted to a schema, and the format-preserving encryption system can use the schema to generate ciphertext that conforms to the same schema as the input plaintext. Data in a complex data format can be represented as a sequence of data parts, each of which corresponds to a respective schema part that specifies a format for the data part. Each schema part can specify constraints such as a set of valid characters, a length in characters of values that are valid, minimum and maximum valid values, specific values that are not valid, and so on.

To encrypt input data that conforms to a complex data format, the format-preserving encryption (FPE) system can transform the input data to an input intermediate numeric value that corresponds to a combination of the input data parts. The input intermediate numeric value can be represented in a simple data format, e.g., a single character set, and is thus compatible with a fixed-radix format-preserving encryption algorithm, such as the "FF1" algorithm, which can perform FPE on data in a simple format and produce an encrypted intermediate numeric value in the same simple format. The FPE system can then map the encrypted intermediate value to a sequence of encrypted data parts that conforms to the complex data format, as described below.

To transform the input data to the intermediate numeric value suitable for the fixed-radix encryption algorithm, the FPE system can map each of the input data parts to a numeric value referred to herein as a "digit." Each digit can be determined by subtracting, from the respective data part, the number of invalid values that the data part cannot be equal to (as specified by the data format) that are less than the data part. That is, a digit need not be assigned to an input that does not correspond to a valid input part. For example, if a constraint specifies that an input part cannot be "ac" then there is no need to assign a digit to "ac." In this example, the input "aa" maps to the digit, the input "ab" maps to the digit 1, and the input "ad" maps to the digit 2. Further, as an example, if "a" is assigned to 0, "b" to 1, and so on, with "z" being assigned to 25, then "zz" maps to the digit 674 because 26*25+25=675, and 1 is subtracted from 675 because the invalid value "ac" is an invalid possibility. Thus, each invalid input part possibility is removed from the number of possibilities, and the digit values are renumbered so there are no gaps in the list of values. Using this mapping, the FPE system generates a digit value that is less than the number of possible values of the corresponding data part (as specified by the data format) for any of the valid digit values. Then, to map the input data to a numeric value, the FPE system can interpret the digits of the data using a positional numeral system in which the position of each digit corresponds to the position of the respective data part in the input data. For example, the first data part in the input data (according to the order specified by the data format) can be interpreted as the most-significant digit, and the last data part in the input data can be interpreted as the least-significant digit. The intermediate numeric value can then be determined as a weighted sum in which each digit is multiplied by a weight that corresponds to the digit's position. For example, each digit can be multiplied by the number of possible values of each of the digits in less-significant positions, except for the least-significant digit. The numbers by which the digits are multiplied are referred to herein as "weights."

The FPE system can encrypt the intermediate numeric value using a format-preserving encryption algorithm that is compatible with data represented in a single numeric base to generate an encrypted intermediate numeric value. If the encrypted intermediate numeric value corresponds to a valid sequence of part values, then the FPE system transforms the encrypted intermediate numeric value to output data by reversing the transformation that was performed to generate the input intermediate numeric value from the input data. The encrypted intermediate numeric value corresponds to a valid sequence of part values if, for example, the encrypted intermediate numeric value is less than the number of possible data values that conform to the complex data format ("number of possible data values"). If the encrypted intermediate numeric value is greater than the number of possible data values, the FPE system invokes the FF1 encryption algorithm repeatedly, using the output of the previous invocation as input for each invocation, until the output of the FF1 encryption satisfies threshold criteria. The threshold criteria can be, for example, that the output of the FF encryption is less than the number of possible data values. After one or more invocations, the FF1 algorithm produces an encrypted numeric value that satisfies the threshold condition and can be transformed to a sequence of output data parts that conform to the data format. Although the threshold criteria is described in particular examples herein as being that the output of FF1 is less than the number of possible data values, the threshold criteria may include any suitable comparison between the output of FF1 and the number of possible data values. For example, the threshold criteria may be that the output of FF1 is less than or equal to the possible number of data values. Further, the threshold criteria may include additional criteria. For example, the determined number of possible data values may be an upper bound on the total number of possible data values, such that there may be some intermediate numeric values that do not correspond to any valid input tokens. Thus, one or more additional constraints may be included in the threshold criteria to check that the output of FF1 corresponds to a valid input token.

One or more constraints may each be based on multiple schema parts. For example, by themselves, the values "2" and "31" are, respectively, valid day and month inputs. However, February 31 is not a valid date, so a complex constraint may specify that the combination of a month value of "2" and a day value of "31" is invalid. As another example, each of the input parts "111", "11", and "1111" may be a valid individual component of a social security number. However, in combination, the three input parts "111-11-1111" are not valid. Thus, a complex constraint may specify that the combination of three input parts "111-11-1111" is not a valid social security number.

Upon identifying an encrypted intermediate numeric value that is less than the number of possible data values, the FPE system can perform the reverse transformation to transform the encrypted intermediate numeric value to output data that conforms to the complex data format. The reverse transformation can involve determining a sequence of output part values such that a weighted sum of the output part values is equal to the encrypted intermediate numeric value, wherein the weights are based on the number of possible values of the data parts, as described above. In the computation of the weighted sum, each of the output part values is multiplied by the weight associated with the data format part to which the output part value corresponds. The output part values can be determined by finding a set of output part values such that the weighted sum of the output part values corresponds to the encrypted intermediate numeric value. The FPE system can then generate output data that includes each output part value according to the data format.

Advantages of the present disclosure include, but are not limited to, the ability to encrypt data in a complex data format, such a data format having heterogeneous parts having different sets of valid characters, or having constraints such as at least one non-zero character, and to generate encrypted data that conforms to the complex data format. The disclosed format-preserving encryption system can be used to enhance the data security in an application by performing format-preserving encryption operations on the application's data, including data that conforms to complex data types having constraints or heterogeneous parts. Using the disclosed format-preserving encryption system in such an application causes the encrypted data to conform to the application's complex data types, so the encrypted data does not cause errors such as validation failures or data incompatibility problems. Thus, an application can be extended to use encryption for complex data types by adding invocations of the appropriate format-preserving encryption and decryption operations at appropriate locations in the program code, or otherwise transforming the application data using the disclose format-preserving encryption system, with no need to modify the application to process encrypted data differently from non-encrypted data or perform other encryption-specific processing. Since the encrypted data conforms to the application's complex data formats, the existing application logic can perform operations such as storing, retrieving, and displaying encrypted data in complex formats without the need for costly and time-consuming modifications to perform those operations on encrypted data.

FIG. 1 illustrates an example data schema 100 that can represent data formats in accordance with particular embodiments of the present disclosure. A complex data format can be represented by a data schema 100 that has multiple schema parts 102, each specifying the valid values for a corresponding part of input data. Each schema part 104 can be an encryptable schema part 106 that represents a data part such as an encryptable portion of input data, a literal schema part 130 that represents a literal value such as a dash or other delimiter between encryptable portions of input data, or a compound schema part 140 that can be used to specify a more complex data format. A compound schema part 140 can specify a concatenation part 142 that represents a sequence of schema parts 144, an "or" schema part 146 that represents one of a specified set of schema parts 148, or a "multiple" schema part 150 that represents a sequence of one or more occurrences of a specified schema part 152. For example, multiple schema parts 102 of the data schema 100 can be represented using a top-level "concat" part 142 in which each schema part 144 represents one of the schema parts 102. Each of the schema parts 144, 148, 152 can be a schema part 104 that can in turn recursively include one or more of an encryptable schema part 106, a literal schema part 130, or a compound schema part 140. The data schema 100 can specify constraints 116 that can be applied to plaintext or ciphertext data. Each schema part 104 can include one or more constraints 116 that apply to the schema part 104 and/or sub-parts 144, 148, or 152 of the schema part 104, as described below. Different schema parts 104 can have different constraints 116. Data that matches the sequence of encryptable schema parts and/or literal schema parts 130 and satisfies the constraints 116 specified by the schema 100 is referred to herein as "conforming" to the schema 100 or being "valid" according to the schema 100. The schema can be represented as a JSON object, for example.

A data schema 100 can include a set or ordered sequence of schema parts 102, which can include one or more schema parts 104, such as a first schema part 104A and an Nth schema part 104N. Each schema part 104 can correspond to a data part (not shown) of particular data. As described above, each schema part 104 can include one or more of an "encryptable" schema part 106, a "literal" schema part 130, or a "compound" schema part 140. Data, which can be encryptable (e.g., plaintext) or encrypted (e.g., ciphertext), can include one or more data parts, each of which can correspond to respective schema part of a schema. Particular data, e.g., input data or encrypted data, conforms to the schema 100 if the particular data includes a data part that corresponds to each schema part 104 and satisfies each of the constraint(s) 116 specified by the schema 100. The sequence of schema parts 102 can represent an ordered sequence, in which case data conforms to the schema 100 if the data parts are in the same order as the respective schema parts 104 of the sequence 102.

Each constraint 116 can specify, for example, an upper bound, a set of values that are not permitted, and so on, as described below. Each constraint 116 of a schema part 104 can apply to each encryptable schema part 106, literal schema part 140, and/or compound schema part 140 (including sub-parts 144, 148, or 152 of a concatenation part 142, or part 146, or multiple part 150), unless the constraints 116 of the schema part 104 include an "applies to" constraint 160. If the constraints 116 include an "applies to" constraint 160, then each of the constraints 116 applies to specified schema parts of the schema part 104 identified by one or more schema part identifiers 162. The specific schema parts identified by the part identifiers can include an encryptable schema part 106, a literal schema part 130, and/or a compound schema part 140, and/or one or more identified sub-parts 144, 148, or 152 of a concatenation part 142. The schema part identifiers 162 can be, e.g., numeric values that identify the schema parts 106, 130, and/or 140.

As an example, a United States Social Security Number ("SSN"), such as 123-45-6789, has five data parts, of which three are encryptable numeric values (123, 45, and 6789). A SSN schema can thus have five parts corresponding to the five data parts of the SSN. The first schema part can specify that the corresponding data part has a length of three characters, each of which is a decimal digit. The first schema part can also have constraints specifying that the first part is not equal to 0 and is less than 900. The second schema part can correspond to the first dash in the SSN, and can specify that the corresponding data part has a literal value of "-". The remaining schema parts can specify that the third data part has a length of two characters, each of which is a decimal digit, and is not equal to 0, the fourth data part has the literal value "-", and the fifth data part has a length of four characters, each of which is a decimal digit, and is not equal to 0.

An encryptable schema part 106 represents a corresponding data part that can be encrypted (using an encryption key) to form ciphertext. In the case of a data part that has been encrypted, the encryptable schema part represents data than can be decrypted (e.g., using the encryption key) to form plaintext. An encryptable schema part 106 specifies that the corresponding data part is a sequence of characters from a specified character set 108. Each encryptable schema part 106 can also specify a minimum length 110 and maximum length 112 in characters. Each encryptable schema part 106 can specify one or more constraints 116. The constraints 116 can include one or more of: a lower limit constraint 118, an upper limit constraint 120, an excluded value(s) constraint 122, a checksum constraint 124 (e.g., a Luhn checksum constraint), or a date constraint 126. The lower limit constraint 118 can specify a lower limit value (e.g., a number or character) to indicate that the data part corresponding to the encryptable schema part 106 is to be greater than the specified value. The upper limit constraint 120 can specify an upper limit value to indicate that the data part corresponding to the encryptable schema part 106 is to be less than the specified value. The excluded value(s) constraint 122 can specify one or more excluded values to indicate that the corresponding data part is not to have any of the excluded values. The lower limit constraint 118 and upper limit constraint 120 can thus specify a range of valid values of the corresponding data part.

The checksum constraint 124 specifies whether the corresponding data part(s) to which the constraint 124 applies satisfy checksum criterion. For example, if the checksum is a Luhn checksum, the checksum criterion is that the final character of the data part (or concatenation of the data parts if the constraint 124 applies to more than one data part) is a Luhn checksum value of the preceding characters of the data part. The Luhn checksum constraint 145 can be a Boolean value indicating whether that the corresponding data part is to satisfy the Luhn checksum criterion, for example. If the corresponding data part(s) to which the constraint 124 applies do not satisfy the Luhn checksum criterion, then the corresponding data part(s) do not conform to the schema 100.

The Date constraint 126 specifies that one or more encryptable schema parts 106 to which the constraint 124 applies form a date. For example, the date constraint 126 can specify that one or more of the encryptable schema parts 106, e.g., schema parts named "day", "month", and "year", are numbers that correspond to a day, month, and year, of a date.

A schema part 104 can also be a literal schema part 130, which specifies a literal value 132 that is not to be encrypted. For example, a literal part may specify a dash in an SSN schema, as described in the example above. A schema part 104 can also be a compound schema part 140, which can represent a concatenation of one or more specified schema parts 144A-144N. A schema part 104 can also be an or (e.g., disjunction) part 146, which can represent any one of a set of specified schema parts 148A-1348N. A schema part 104 can also be a multiple part 150, which can represent two or more consecutive occurrences of a specified schema part 152.

Figure 2:
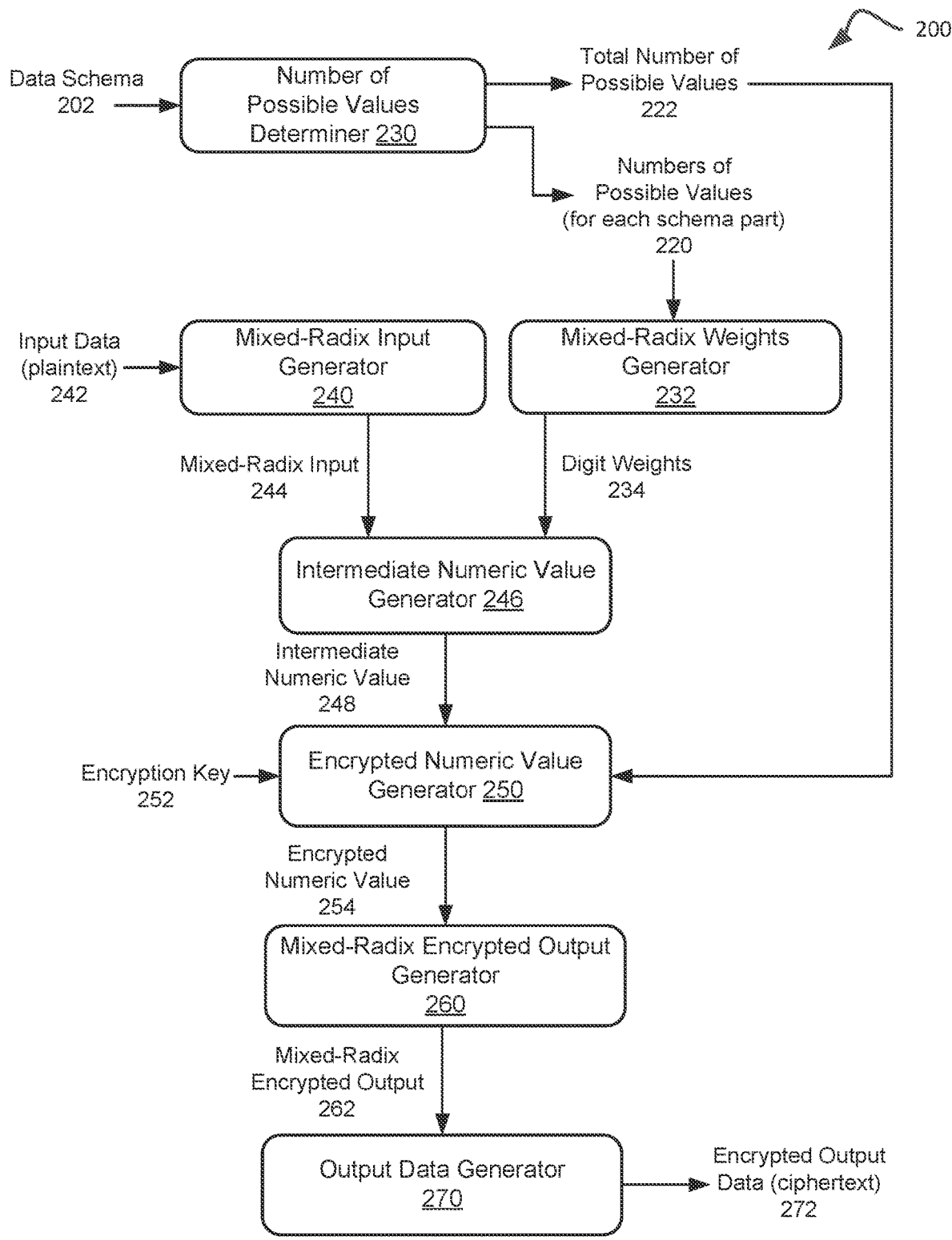
FIG. 2 illustrates an example format-preserving encryption system in accordance with particular embodiments of the present disclosure.

FIG. 2 illustrates an example format-preserving encryption system 200 in accordance with particular embodiments of the present disclosure. The format-preserving encryption system 200 can receive a data schema 202, such as the data schema 101 of FIG. 1, input data 242 that conforms to the data schema 200, and an encryption key 252 from a data store, communications network, or other data source. The format-preserving encryption system 200 can be invoked by, invoke, or otherwise communicate with an application program, operating system, or other components of a computer system. The format-preserving encryption system 200 generates encrypted output data 272, which is an encrypted representation of the input data 242 and conforms to the data schema 202.

The format-preserving encryption system 200 can map the input data 242 to an intermediate numeric value 248 that corresponds to a combination of the values of the parts of the input data. The intermediate numeric value 248 can be represented in a simple data format, e.g., a single character set, and is thus compatible with a fixed-radix format-preserving encryption algorithm, such as the "FF1" algorithm, which can perform FPE on data in a simple format and produce an encrypted intermediate numeric value in the same simple format. "Radix" herein shall refer to the number of characters in a given alphabet. "Radix" is synonymous with "base." For example, for base 10, the alphabet includes the characters 0 and 9.

The format-preserving encryption system 200 includes a Number of Possible Values Determiner 230, which receives the data schema 202 and determines numbers of possible values, which include a number of possible values 220 for each schema part of the data schema 202. The data schema 202 and schema parts are described with respect to FIG. 3 below. A Mixed-Radix Input Generator 240 receives the input data 242 (which can be plaintext) and generates mixed-radix input 244, which can be a set of numeric digits representing the individual parts of the input data, as described with respect to FIG. 4A below. "Digit" herein refers to a numeric value that represents a data part value, and can be one or more characters in length. A digit can have an associated base, which corresponds to the number of possible values of the digit.

A Mixed-Radix Weights Generator 232 generates digit weights 234 based on the numbers of possible values (for each schema part) 220, as described with respect to FIG. 3 below. An Intermediate Numeric Value Generator 246 generates an intermediate numeric value 248 based on the mixed radix input 244 and digit weights 234, as described with respect to FIG. 4A below. An Encrypted Numeric Value Generator 250 encrypts the intermediate numeric value 248 with an encryption key 252 to generate an encrypted numeric value 254. The Encrypted Numeric Value Generator 250 can use a fixed-radix format-preserving encryption algorithm such as the FF1 algorithm or other algorithm that can perform format preserving encryption on a data value represented in a single character set, as described with respect to FIG. 5 below. The Encrypted Numeric Value Generator 250 can generate an encrypted numeric value 254 that corresponds to a sequence of data parts that conform to the data schema 202 by verifying that the encrypted numeric value 254 is less than (or, in some embodiments, equal to) the total number of possible values 222. If the encrypted numeric value 254 is not less than (or, in some embodiments, equal to) the total number of possible values 222, the Encrypted Numeric Value Generator 250 can invoke the fixed-radix format-preserving encryption algorithm to encrypt the encrypted numeric value 254, and repeat the invocations until the fixed-radix format-preserving encryption algorithm generates an encrypted numeric value 254 that is less than (or, in some embodiments, equal to) the total number of possible values 222.

The format-preserving encryption system 200 can transform the encrypted numeric value 254 to encrypted output data 272 that conforms to the data schema 202 by reversing the transformation that was performed to generate the intermediate numeric value 248 from the input data 242. A Mixed-Radix Encrypted Output Generator 260 transforms the encrypted numeric value 254 into mixed radix encrypted output 262, as described with respect to FIG. 6 below. An Output Data Generator 270 generates encrypted output data 272 based on the mixed-radix encrypted output 262, as described with respect to FIG. 7 below. The encrypted output data 272 conforms to the data schema 202, and can be decrypted using the encryption key 252 or a key associated with the encryption key 252 by reversing the operations shown in FIG. 2.

Figure 3:
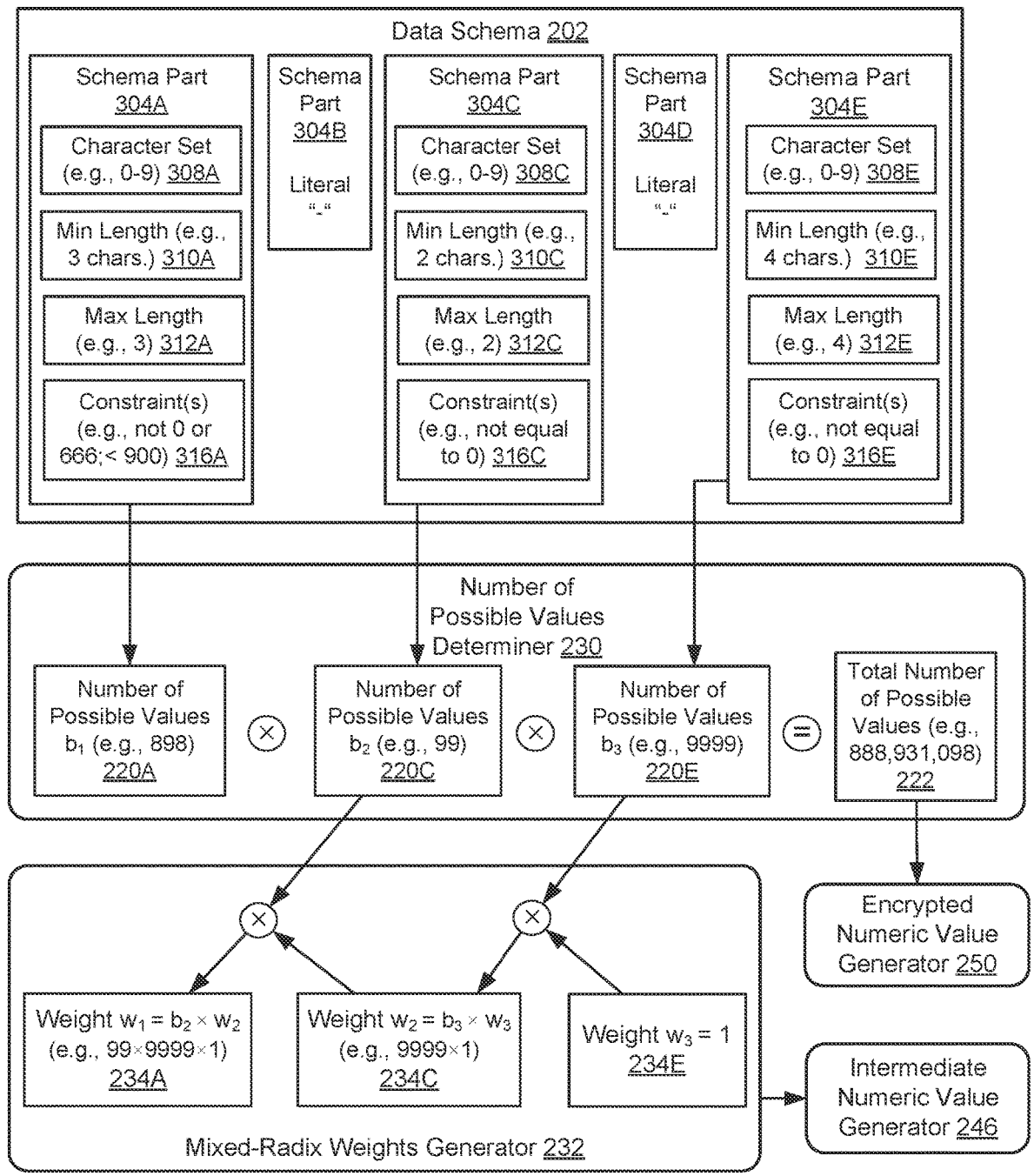
FIG. 3 illustrates an example data schema, Number of Possible Values Determiner, and Mixed-Radix Weights Generator in accordance with particular embodiments of the present disclosure.

FIG. 3 illustrates an example data schema 202, Number of Possible Values Determiner 230, and Mixed-Radix Weights Generator 232 in accordance with particular embodiments of the present disclosure. The Number of Possible Values Determiner 230 can determine, for each encryptable schema part 304 of a data schema 202, a respective number of possible values 220. The Number of Possible Values Determiner 230 also determines a total number of possible values 222, e.g., by multiplying the numbers of possible values 220 together. The total number of possible values 222 is used by an Encrypted Numeric Value Generator 250, as described with respect to FIG. 5A below. The Mixed-Radix Weights Generator 232 can generate digit weights 234 based on the numbers of possible values 220. The digit weights 234 are used by an Intermediate Numeric Value Generator 246, as described with respect to FIG. 4A below.

An example data schema 202 specifies a data format of a United States Social Security Number ("SSN"). The SSN format has five schema parts, and represents data such as 123-45-6789. The first, third, and fifth schema parts are encryptable data parts, and the second and fourth schema parts are literal parts, each of which represents the literal character "-". As shown in FIG. 3, a first schema part 304A specifies a character set 308A (e.g., 0-9), a minimum length 310A (e.g., 3 characters), a maximum length 312A (e.g., 3 characters), and constraints 316A (e.g., not equal to 0, not equal to 666, and less than 900). The second schema part 304B specifies a literal value "-". The third schema part 304C specifies a character set 308C (e.g., 0-9), a minimum length 310C (e.g., 2 characters), a maximum length 312C (e.g., 2 characters), and a constraints 316C (e.g., not equal to 0). The fourth schema part 304D specified another literal value "-". The fifth schema part 304E specifies a character set 308E (e.g., 0-9), a minimum length 310E (e.g., 4 characters), a maximum length 312E (e.g., 4 characters), and constraints 316E (e.g., not equal to 0). Although the encryptable schema parts 304A, 304C, 304E each specify the same character set 308 in this example, different encryptable schema parts can specify different character sets in other examples.

The Number of Possible Values Determiner 230 determines for each encryptable schema part 304A, 304C, 304E, a respective number of possible values 220A, 220C, 220E that represents a number of possible values of the respective schema part. The Number of Possible Values Determiner 230 can use the information specified in each schema part, such as the character set, minimum and maximum lengths, and constraints, to determine the number of possible values. For example, the first schema part 304A specifies that each character in the corresponding data part is a number between 0 and 9, the length of the data part is three characters, the values 0 and 666 are excluded, and the data part is less than 900. Thus, the valid data parts that conform to the first schema part 304A are 1 through 899, except for 666, so there are 898 possible values that conform to the first schema part 304A. Accordingly, the number of possible values 220A of the first schema part 304A is 898. Similarly, the number of possible values 220C of the third schema part 304C is 99, and the number of possible values (b3) 220E of the fifth schema part 304E is 9999. The Number of Possible Values Determiner 230 can determine a total number of possible values 222 as a product of the numbers of possible values 220. In this example, the total number of possible values 222 is the product of 898, 99, and 9999, which is 888,931,098.

A Mixed-Radix Weights Generator 232 can generate a weight 234 for each of the encryptable schema parts 304. The encryptable schema parts 304 can correspond to digits in a positional number system, as described below with respect to FIG. 4A. One of the positional digits can be referred to as a most-significant digit, and another can be referred to as a least-significant digit. In the examples described herein, the first schema part 304A is referred to as the most-significant schema part, and the fifth schema part 304E is referred to as the least-significant schema part. Thus, in the examples described herein, significance decreases from left to right. That is, the third schema part 304C has less significance than the first schema part 304A, and the fifth schema part 304E has less significance than the third schema part 304C. The terms "most-significant" and "least-significant" are used herein for explanatory purposes to refer to the schema parts 304C according to a particular ordering. However, in other examples, the first schema part 304A and fifth schema part 394E are not necessarily the most-significant part and least-significant parts, respectively. In other examples, any suitable ordering of the schema parts can be used. In another example, the first schema part 304A can be referred to as the least-significant schema part, and the fifth schema part 304E can be referred to as the most-significant schema part.

The numbers of possible values 220A, 220C, 220E can be referred to as $b_1$, $b_3$, and $b_5$, respectively. Each number of possible values is analogous to a numeric base of the corresponding data part in a positional numeral system. A set of weights 234 can be used to transform a sequence of input data parts, which can each have a different number of possible values (and thus a different numeric base) to an intermediate numeric value 248 in a single base (e.g., a sequence of base-10 digits) by computing a weighted sum of the data parts, as described below with respect to FIG. 4A. Each weight 234 corresponds to a particular schema part 304 and can be determined as a product of the numbers of possible values 220 that correspond to schema parts 304 having lower-significance than the particular schema part 304, except that the weight 234E of the least-significant schema part 304E can have the predetermined value 1.

Thus, a weight 234A, which corresponds to the first schema part 304A, can be determined by multiplying the numbers of possible values 220C, 220E of each of the lower-significance schema parts 304C, 304E. In this example, weight 234A is the product of 99 (the number of possible values 220C) and 9999 (the number of possible values 220E), the weight 234C is 9999 (the number of possible values 220E). The weights 234A, 234C, 234E can be referred to as $w_1$, $w_2$, $w_3$, respectively, in which case $w_1 = b_2 \times b_3 = 99 \times 9999$, $w_2 = b_3 = 9999$, and $w_3 = 1$.

Alternatively or additionally, each weight can be calculated as the product of the adjacent lower-significance weight and the adjacent lower-significance number of possible values 220, except for the least-significant weight, which is 1. Thus, the most-significant weight 234A ($w_1$) can be calculated as the product of its adjacent less-significant weight 234C ($w_2$) and adjacent less-significant number of possible values 220C ($b_2$).

Similarly, the second-most-significant weight 234C ($w_2$) can be calculated as the product of its adjacent less-significant weight 234E ($w_{3=1}$) and adjacent less-significant number of possible values 220E ($b_3$). Thus, in this example, $w_3 = 1$, $w_2 = b_3 \times w_2 = 9999 \times 1$, and $w_1 = b_2 \times w_2 = 99 \times 9999 \times 1$.

The multiplication by 1 can be omitted, so:

$w_2 = b_3 = 9999$, and $w_1 = b_2 \times w_2 = 99 \times 9999$.

The Mixed-Radix Weights Generator 232 can provide the weights to the Intermediate Numeric Value Generator 246, which is described below with respect to FIG. 4A. Although a data schema 202 having particular schema parts 304 representing a particular data format is described herein, the data schema 202 can have any suitable schema parts 304 that represent any suitable data format. Further, although particular input parts, output parts, and other elements corresponding to the schema parts 304 are described herein, the input parts, output parts, and other elements corresponding to the schema parts 304 can be any suitable parts corresponding to the schema parts 304.

Figure 4A:
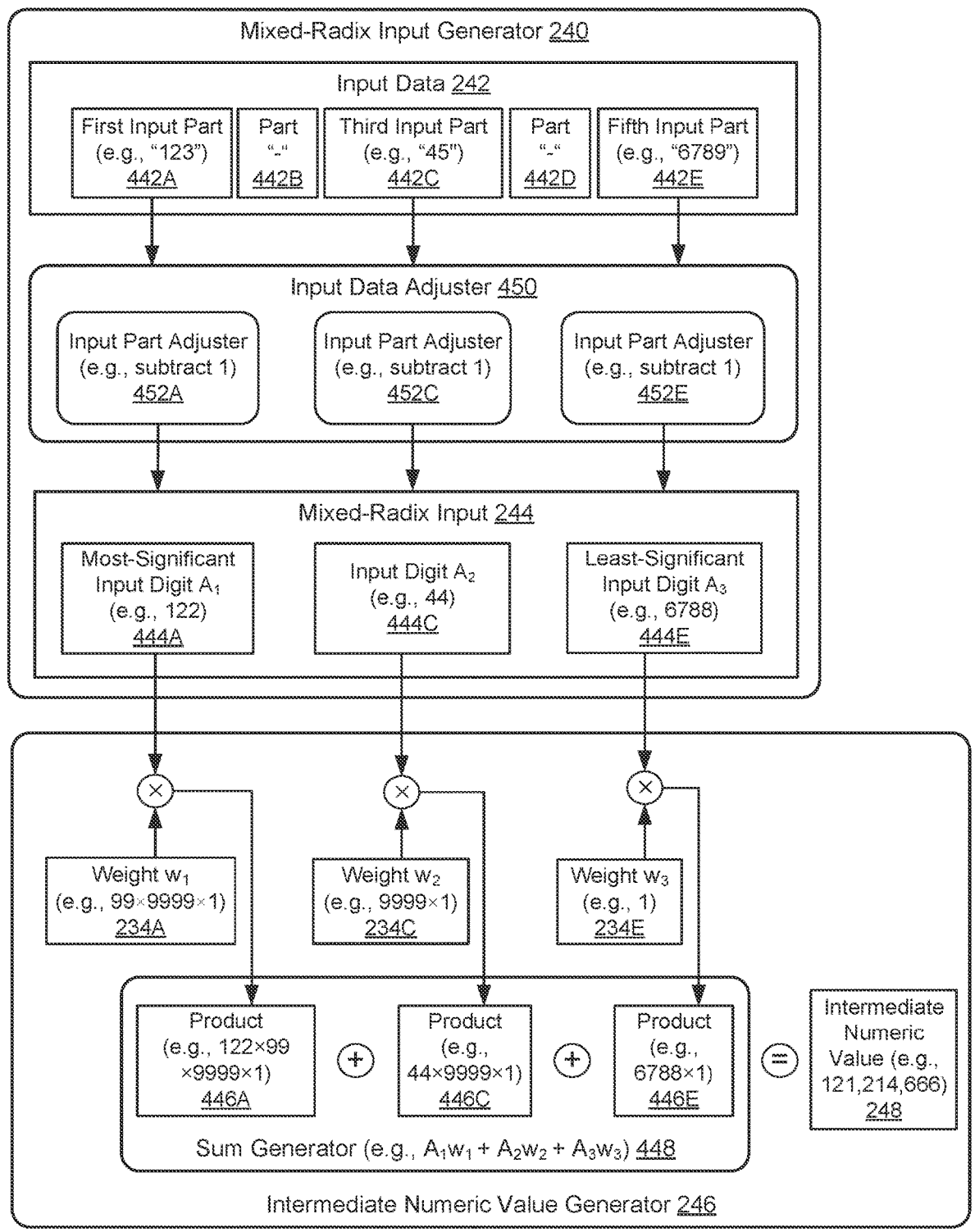
FIG. 4A illustrates an example Mixed-Radix Input Generator and an example Intermediate Numeric Value Generator in accordance with particular embodiments of the present disclosure.

FIG. 4A illustrates an example Mixed-Radix Input Generator 240 and an example Intermediate Numeric Value Generator 246 in accordance with particular embodiments of the present disclosure. The Mixed-Radix Input Generator 240 receives input data 242 and transforms the input data 242 to mixed-radix input 244 that includes a sequence of input digits 444 in which each input digit corresponds to a respective one of the input parts (and a respective schema part of the data schema 202). The Intermediate Numeric Value Generator 246 can map the mixed-radix input 244 to an intermediate numeric value 248 that corresponds to a combination of the values of the parts of the input data. The intermediate numeric value 248 can be represented in a simple data format, e.g., a single character set, and is thus compatible with a fixed-radix format-preserving encryption algorithm, such as the "FF1" algorithm, which can perform FPE on data in a simple format and produce an encrypted intermediate numeric value in the same simple format.

The Mixed-Radix Input Generator 240 transforms each input part 442 to the respective input digit 444 by adjusting (e.g., reducing) one or more of the input parts 442 of the input data 242 to adjusted values such that there are no gaps, e.g., no unused values corresponding to values prohibited by the schema, in the range of possible values between 0 and the number of possible values of the input part 442. Each input digit 444 can be determined by subtracting, from the respective data part, the number of invalid values that respective the input data part 442 cannot be equal to (as specified by the data schema 202) that are less than the input data part. Thus, if a schema part does not specify any prohibited values, then no adjustment of the respective input part 442 is performed, and the respective input digit 444 has the same value as the respective input part 442. Further, if a schema part specifies one or more prohibited values (e.g., a "not equal to 0" constraint) that are less than the respective input part 442, then the respective input digit 444 is set to the value of the respective input part 442 minus the number of prohibited values that are less than the respective input part 442. If each prohibited value specified by the respective schema part is greater than the value of the respective input part 442, then no adjustment of the respective input part 442 is performed.

For example, if a schema part 304 specifies that a data part can be between the values 5 and 10, then the data part is mapped to the corresponding digit by subtracting 5 from the data part, since 0 through 4 are invalid values. Using this mapping, the Mixed-Radix Input Generator 240 generates an input digit value 444 that is less than the number of possible values of the respective data part (as specified by the schema part 304) for any of the valid digit values. For example, for the data part that can be between 5 and 10, the number of possible values is 6, and the greatest valid part value, 10, is mapped to the digit value 10−5=5, which is less than 6. Thus, the valid digit values of each data part are greater than or equal to 0, and less than the number of possible values (6) specified by the respective schema part 304.

In the example of FIG. 4A, the first input part 442A is 123, which is greater than one of the prohibited values (0), so the input part adjuster 452A subtracts 1 from the first input part 442A to generate the value of the most-significant input digit 444A, which is 122. The second input part 442B is a literal, and so is not encrypted or decrypted. The third input part 442C is 45, which is greater than the prohibited value (0), so the input part adjuster 452C subtracts 1 from the third input part 442C to generate the value of the input digit 444C, which is 44. The fifth input part 442E is 6789, which is greater than the prohibited value (0), so the input part adjuster 452E subtracts 1 from the fifth input part 442E to generate the value of the least-significant input digit 444E, which is 6788. The Mixed-Radix Input Generator 240 provides the mixed-radix input 244 to the Intermediate Numeric Value Generator 246.

To map the mixed-radix input 244 to an intermediate numeric value 248 represented in a simple data format, the Intermediate Numeric Value Generator 246 can compute a weighted sum of the mixed-radix input digits 444 using the digit weights 234. An input sum generator 448 can multiply each input digit 444 by the respective weight 234 to generate a respective product 446, and calculate the sum of the products 446. The intermediate numeric value 248 can be the sum of the products 446. For example, the input digits 444A (most significant), 444C, and 444E (least significant) which have the values 122, 44, and 6788, respectively, can be referred to as $A_1$, $A_2$, and $A_3$, respectively. The example intermediate numeric value 248 can then be calculated as the weighted sum $A_1w_1+A_2w_2+A_3w_3=122\times99\times9999+44\times9999+6788\times1=121,214,666$.

Figure 4B:
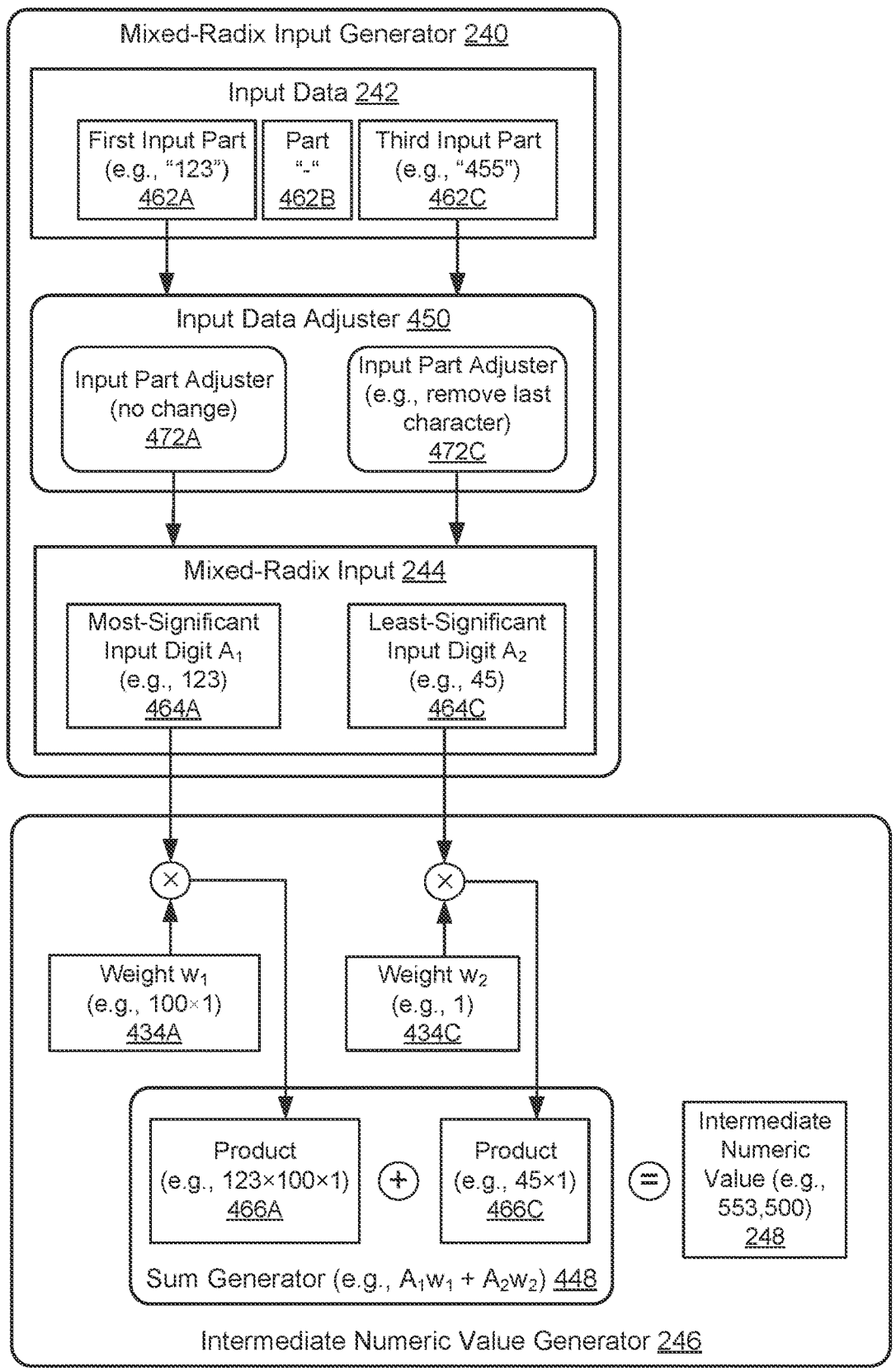
FIG. 4B illustrates an example Mixed-Radix Input Generator and an example Intermediate Numeric Value Generator with input data that conforms to a checksum constraint in accordance with particular embodiments of the present disclosure.

FIG. 4B illustrates an example Mixed-Radix Input Generator 240 and an example Intermediate Numeric Value Generator 246 with input data that conforms to a checksum constraint in accordance with particular embodiments of the present disclosure. FIG. 4B is similar to FIG. 4A, but has input data 242 that conforms to a Luhn checksum constraint 124. The Luhn checksum is a checksum character at the end (e.g., rightmost character) having a value determined using a Luhn checksum algorithm on the other characters (e.g., all characters except the rightmost character). The input data 242 conforms to a schema 100 that includes a Luhn checksum constraint 124 (not shown in FIG. 4B), which indicates that the data parts to which the constraint 124 applies are to satisfy the Luhn checksum criterion (e.g. that the rightmost character is a Luhn checksum of the other characters). The constraints 116 of the schema also include an "applies to" 160 specifying that the Luhn checksum constraint 124 applies to the schema elements that correspond to the first input part 462A and the third input part 462C. The second input part 462B specifies a literal dash, and need not be included in the Luhn checksum constraint.

Encrypting the input data 242, including the checksum character, can result in encrypted data that does not satisfy the Luhn checksum constraint, since the character at the end of the encrypted data is unlikely to be a valid Luhn checksum of the other characters. Thus, when generating the digits 464 of the mixed-radix input 244, the format-preserving encryption system 200 can remove the checksum character from the input parts 426 to which the checksum constraint applies. The format-preserving encryption system 200 can subsequently add a checksum character to encrypted data (or decrypted data) by computing a checksum character based on the data and appending the checksum character to the data.

In the example of FIG. 4B, the first input part 462A has a value of "123" and the third input part 462C has a value of "455". The schema specifies that the first input part is greater than or equal to 0 and less than 999, and that the third input part is greater than or equal to 0 and less than 99. Thus, the first input part adjuster 472A does not adjust the first or third input part to account for invalid values, and the most-significant input digit 464A is the same as the first input part 462A ("123").

The input data adjuster 450 determines that a Luhn checksum constraint applies to the first and third input parts and removes the last (e.g. rightmost) character from the sequence of input parts to which the Luhn checksum constraint applies. Since the checksum constraint applies to the first input part 462A and the third input part 462C, the first and third input parts are processed as a single value, and the input data adjuster removes the last "5" from the third input part. The least-significant input digit 464C thus has the value "45".

The Intermediate Numeric Value Generator 246 generates the intermediate numeric value 248 as a weighted sum of the input digits 454A and 464C. The weight 434A of the first input digit 454A is 100, since the number of possible values of the adjacent least-significant input digit, 464C, is 100 (0-99, as specified by the schema in this example). The weight 434C of the third input digit 454C is 1, since the third input digit is the least-significant digit. Thus, the example intermediate numeric value 248 can be calculated as the weighted sum $A_1w_1+A_2w_2=123\times100+55\times1=533,500$. The intermediate numeric value 248 can be provided to the Encrypted Numeric Value Generator 250. The format-preserving encryption system 200 can subsequently add a checksum character to encrypted data (or decrypted data) by computing a checksum character based on the data and appending the checksum character to the data.

Figure 4C:
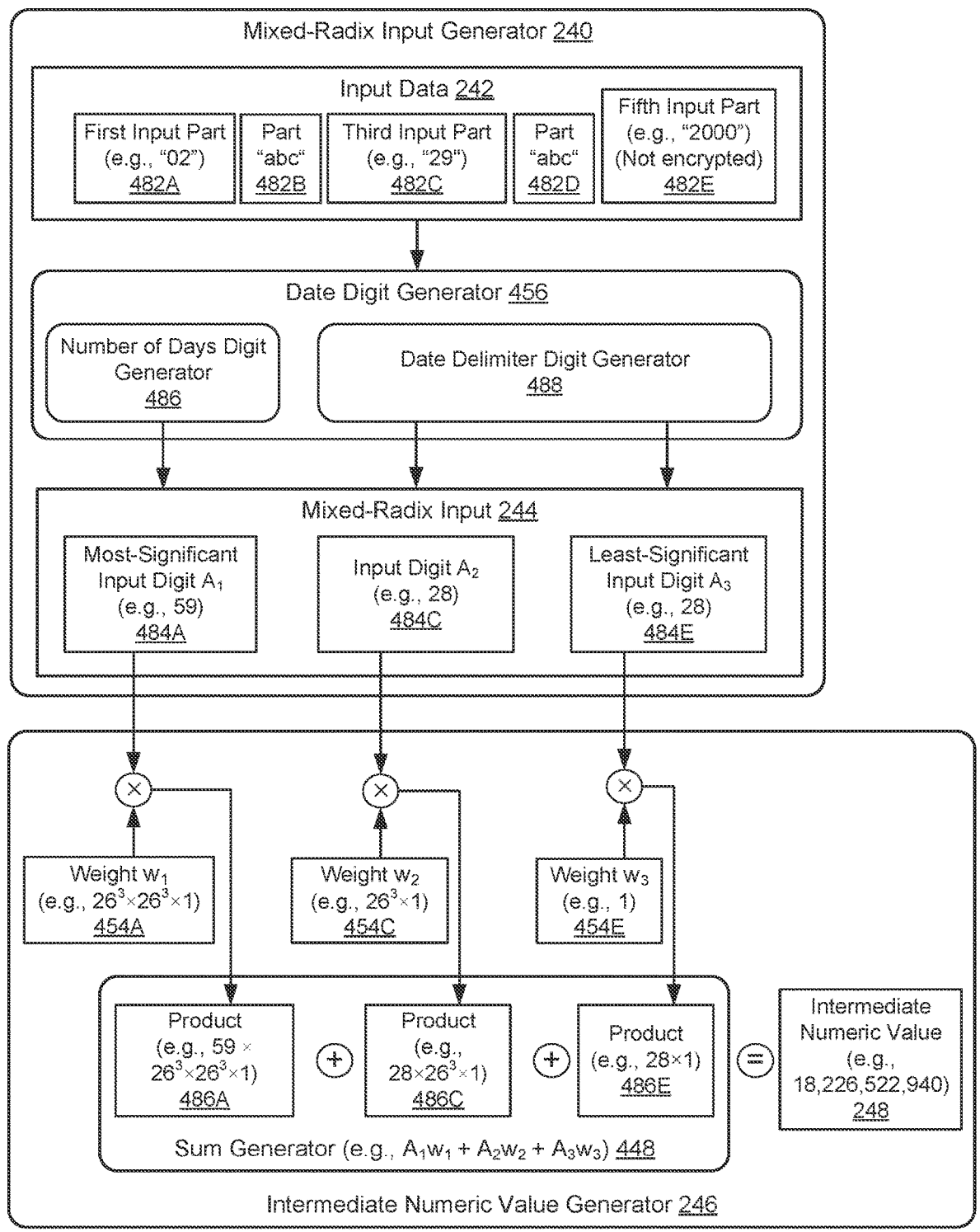
FIG. 4C illustrates an example Mixed-Radix Input Generator and an example Intermediate Numeric Value Generator with input data that includes conforms to a date constraint in accordance with particular embodiments of the present disclosure.

FIG. 4C illustrates an example Mixed-Radix Input Generator 240 and an example Intermediate Numeric Value Generator 246 with input data that conforms to a schema 100 that includes a date constraint 126 in accordance with particular embodiments of the present disclosure. FIG. 4B is similar to FIG. 4A, but has input data 242 that conforms to an example date constraint 126 (not shown in FIG. 4C). The date constraint 126 specifies that the date is in the format mmAAAddAAAyyyy, wherein AAA and BBB are lower-case letters delimiting the month, day, and year components of the date, mm is two numeric characters specifying a month, dd is two numeric characters specifying a year, and yyyy is four numeric characters specifying a year. The date in the input data 242 is represented as 02abc29abc2000, which specifies the date Feb. 29, 2000. The day, month, and year can be separated by other delimiters, such as "/" or "-" literal characters. The example date constraint 126 also specifies that the year portion (yyyy) is preserved, e.g., not encrypted, and that the date is to be earlier than Dec. 1, 2000. Since there are 335 days in the year 2000 prior to December 1, and the year is not encrypted, the number of possible values of the date specified by input parts 482A, 482C, 482E in the input data 242 is 335. The number of possible values of each of the delimiters specified by input parts 482B, 482D is $26^3$, since the input digit is a sequence of three letters, each having 26 possible values.

According to the date constraint described above, a particular date can be specified by multiple input parts 482, some of which specify the date and some of which can be delimiters. The input parts 482 of a date that specify the particular date correspond to a single particular date value, and can thus be converted to a single input digit, e.g., input digit 484A, that represents the single particular date value. The single input digit can represent the date in appropriate units, e.g., days since an initial date, e.g., the beginning of the year 2000 in this example. In this example, the input data 242 "02abc29abc2000" has five input parts, each of which represents a component value of the date: 02, abc, 29, abc, and 2000. The input parts 02, 29, and 2000 specify the date value. However, in this example, the date constraint 126 specifies that the year portion is preserved, e.g., not encrypted, so the year portion (2000) is not converted to a digit. Instead, in this example, the year portion is processed similarly to a literal. In other examples, the year portion can be encrypted, in which case the year portion is included in the conversion to the input digit 484A.

A Date Digit Generator 456 transforms the date parts specified in the input data 242 to digits 484 of mixed-radix input 244. The Date Digit Generator 456 includes a Number of Days Digit Generator 486, which converts input parts 482A, 482C, 482E to a single numeric digit 484A representing the date. The single numeric digit 484A can be a number of days since an initial date, such as Jan. 1, 2000. The Date Digit Generator 456 also includes a Date Delimiter Digit Generator 488, which converts each of the delimiter parts of the input data 242 to a respective numeric digit 484C, 484E.

The Number of Days Digit Generator 486 can convert the month, day, and/or year component values of the date specified in the input parts 482A, 482C, 482E to a single date value, which is 59 days in this example. The single date value is 59 days because February 29 is the 60th day in the year 2000, and the number of days 478 is the number of days after the initial date of Jan. 1, 2000. Thus, the number of days after the initial date is 60−1=59 days in this example. As described above, the year is not encrypted in this example because the year component of the date is designated as preserved data by the date constraint. Further, the Date Delimiter Digit Generator 488 converts the delimiter component values of the date, which are specified in the input parts 482B, 482D, to respective digit values (e.g., 28 for each of the delimiter component values). Further details regarding the Date Digit Generator 456 are described below with respect to FIG. 4D.

In the example of FIG. 4C, the most-significant input digit 484A is set to the single date value (59) from the Number of Days Digit Generator 486. Further, the input digit 484C is set to the value of the first date delimiter (28), and the least-significant input digit 484E is set to the value of the second date delimiter (28). In other examples, the input digits 484 can be any permutation of the date value and the date delimiter value(s). That is, the date can be stored in a different one of the digits 484, e.g., digit 484E, and the delimiter(s) can be stored in the other digits 484, e.g., digits 484A and 484E. Further, in other examples, a single digit can be used to store the value of the date delimiter, e.g., if one date delimiter is used in the date specified in the input data 242. As described above, the number of possible values of each of the input digits 484C and 484E is $26^3$, since the input digit is a sequence of three letters, each having 26 possible values.

The Intermediate Numeric Value Generator 246 generates the intermediate numeric value 248 as a weighted sum of the input digits 484A, 484C, and 484E. The weights 454 are determined based on the numbers of possible values. The weight 454A of the first input digit 484A is $26^3 \times 26^3 \times 1$, since the product of the numbers of possible values of the lower-significance digits, starting at the digit adjacent to the digit 484A (which is the digit 484C), is $26^3 \times 26^3$ (since the number of possibilities of each of the lower-significance input digits 454C and 454E is $26^3$). Further, since the lower-significance digit is the least-significant digit 484E, the weight 454E of the second input digit 484C is the number of possible values of the least-significant digit 484E, which is $26^3$.

Thus, the example intermediate numeric value 248 can be calculated as the weighted sum $A_1w_1+A_2w_2=59\times26^3\times26^3+28\times26^3+28=18,226,522,940$. The intermediate numeric value 248 can be provided to the Encrypted Numeric Value Generator 250.

Figure 4D:
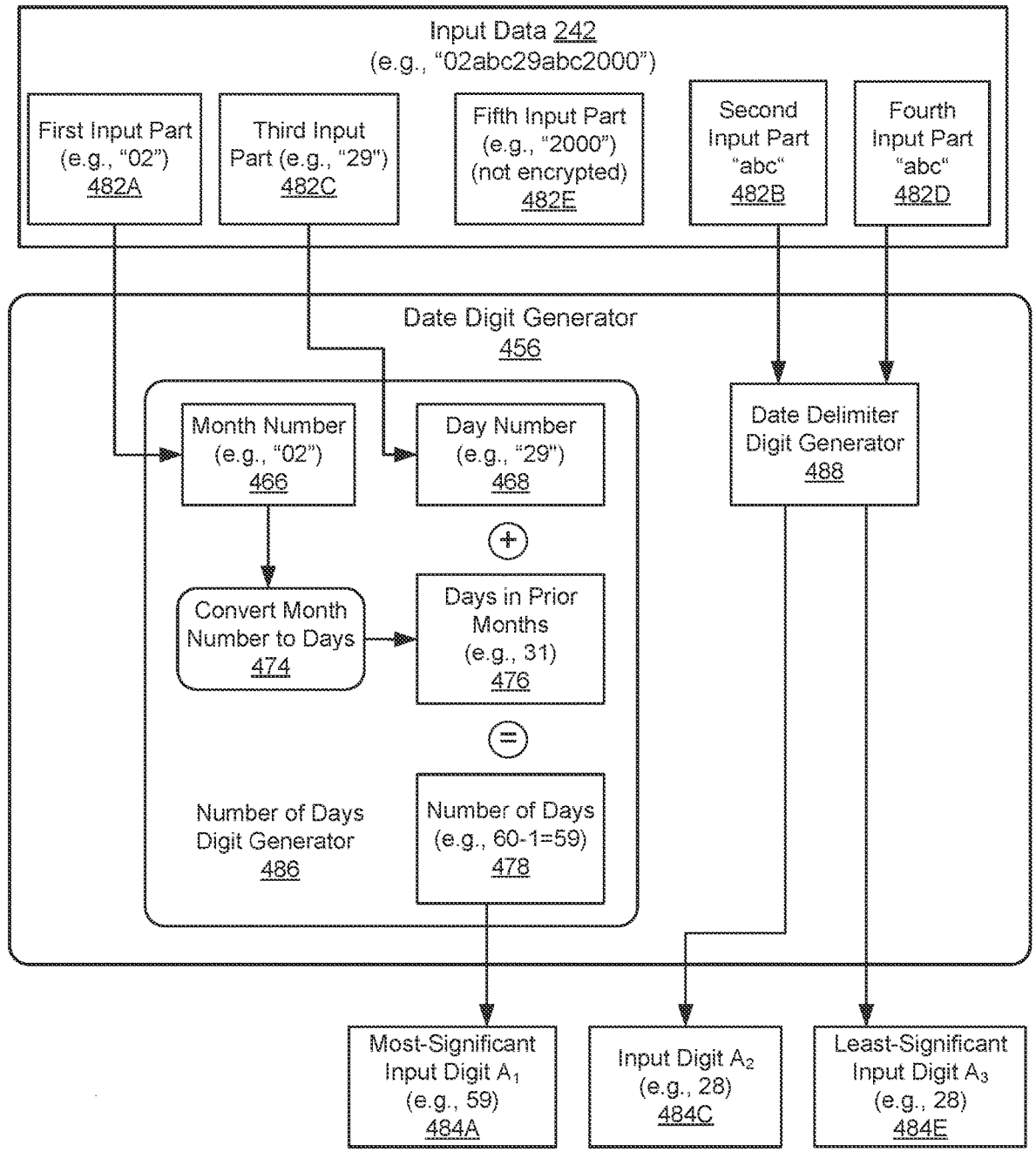
FIG. 4D illustrates a Date Digit Generator that generates one or more digits representing a date value specified in input data in accordance with particular embodiments of the present disclosure.

FIG. 4D illustrates a Date Digit Generator 456 that generates one or more digits 484 representing a date value specified in input data 242 in accordance with particular embodiments of the present disclosure. The date value can include one or more date component values, such as a month, day, and year, that together represent a date value, and one or more delimiter component values that separate the date component values in the input data 242. Each delimiter component value can be, e.g., a hyphen ("-"), a slash ("/"), a string in a specified format ("abc"), or other character(s) that conform to a date constraint 126 of a data schema 100. The generated digits can include a number of days digit 484A that represents the date as a numeric value, and one or more delimiter digits 484C, 484E, each of which represents a delimiter value as a respective numeric value. Each component value of a date in the input data 242 can be mapped to a respective input part 482 of the input data 242.

The Date Digit Generator 456 includes a Number of Days Digit Generator 486, which converts input parts 482A, 482C, 482E of the input data 242 to a numeric digit 484A. The Date Digit Generator 456 also includes a Date Delimiter Digit Generator 488, which converts each of the delimiter parts of the input data 242 to a respective numeric digit 484C, 484E. The value of each numeric digit 484C, 484E is 28 ($0*26^2+1*26+2$).

The Number of Days Digit Generator 486 can convert the date component values of the date specified in the input parts 482A, 482C, 482E (e.g., month and date) to a single number of days 478. The Number of Days Digit Generator 486 can receive a month number 466 and a day number 468. The month number 466 can be from the first input part 482A (e.g., "02"), and the day number 468 can be from the third input part 482C (e.g., "29") in this example. To convert the month number 466 and day number 468 to the number of days 478, the Number of Days Digit Generator 486 can convert the month number 466 to a number of days in prior months 476 (at operation 474). The number of days in prior months 476 can be a total number of days prior to the month that contains the day number 468 (from an initial date, e.g., the beginning of the year 2000 in this example). The number of days in prior months in this example is 31 days, since there are 31 days in the year 2000 prior to the month of February. The Number of Days Digit Generator 486 can add the number of days in prior months 476 (e.g., 31) to the day number of the date's month (e.g., 29) to generate the number of days 478 (e.g., 60) and subtract 1 from the number of days 478 to produce the single date value. The single date value is 59 days because February 29 is the 60th day in the year 2000, day numbering begins at 0, and the year is not encrypted (because it is designated as preserved data by the date constraint). The Date Delimiter Digit Generator 488 can convert the delimiter component values of the date specified in the input parts 482B, 482D (e.g., "abc" and "abc") to respective numeric values, which are each 28 in this example.

Figure 5:
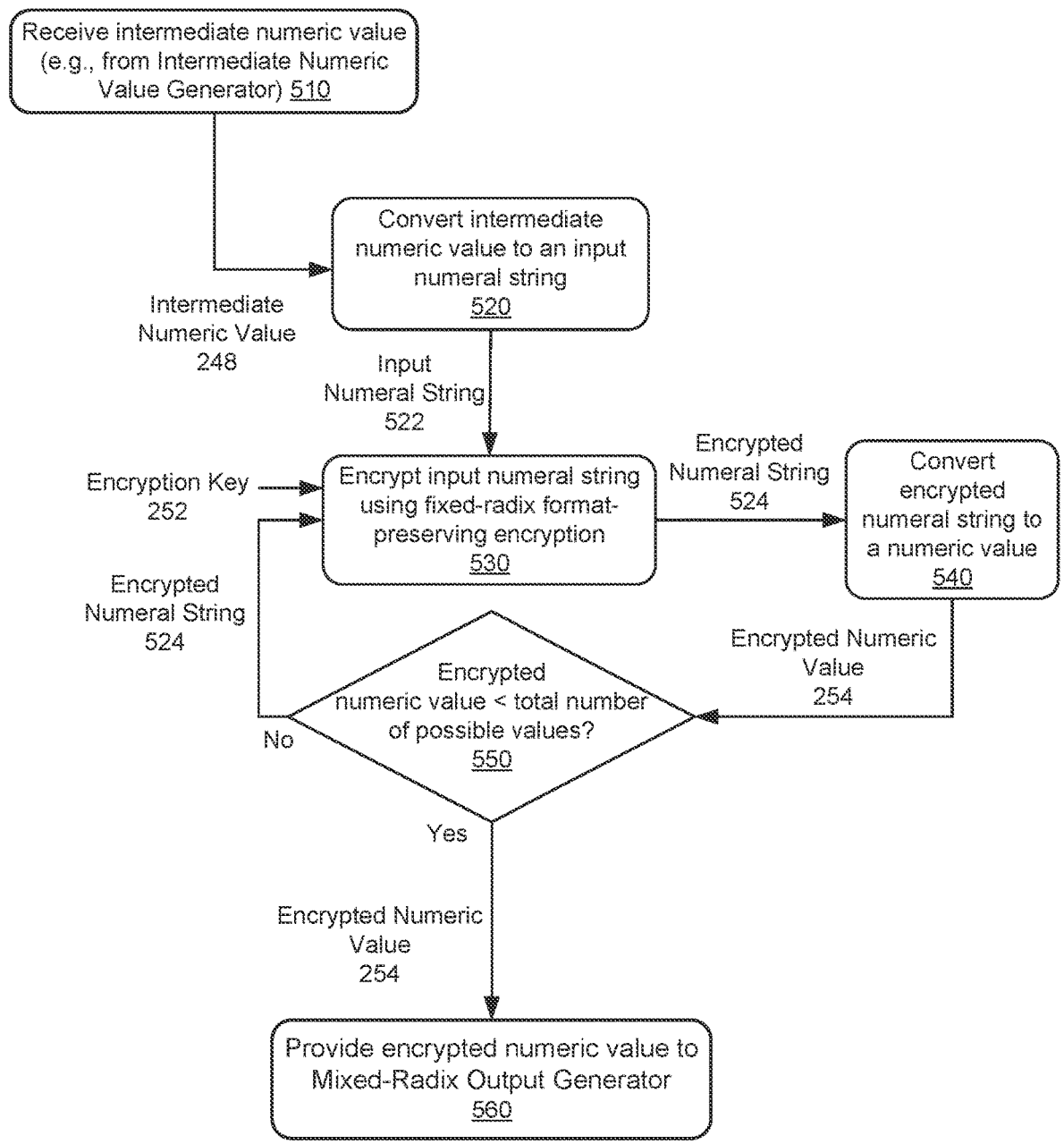
FIG. 5 is a flow diagram of an example method performed by an encrypted numeric value generator to encrypt an intermediate numeric value in accordance with particular embodiments of the present disclosure.

FIG. 5 is a flow diagram of an example method 500 performed by an encrypted numeric value generator 250 to encrypt an intermediate numeric value 248 in accordance with particular embodiments of the present disclosure. In general, the method 250 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 500 may be performed by the format-preserving encryption system 200 of FIG. 2, e.g., by the Encrypted Numeric Value Generator 250.

As shown in FIG. 5A, the method 500 may begin with processing logic receiving an intermediate numeric value 248 (block 510). The processing logic may receive the intermediate numeric value 248 from an Intermediate Numeric Value Generator 246, for example. The processing logic may subsequently convert the intermediate numeric value 248 to an input numeral string 522 (block 520). The input numeral string 522 can be an array of values of a specified radix (or base). For example, the numeral string can be an array of base-10 integers. For example, converting the intermediate numeric value 248 121,214,666 to a numeral string produces an array of nine integers shown herein as 1 2 1 2 1 4 6 6 6.

The processing logic may further encrypt the input numeral string 522 using fixed-radix format-preserving encryption, such as the FF1 encryption algorithm, with an encryption key 252 (block 530). The fixed-radix format-preserving encryption algorithm may use any suitable encryption algorithm, such as an Advanced Encryption Standard (AES) algorithm. The encryption key 252 may be, for example, an AES key. The fixed-radix format-preserving encryption (e.g., FF1) can generate an encrypted numeral string 524. The processing logic may further convert the encrypted numeral string 524 to a numeric value, thereby producing an encrypted numeric value 254 (block 540). The processing logic may further determine whether the encrypted numeric value 254 is less than (or, in some embodiments, less than or equal to) the total number of possible values 222 (block 550). The processing logic may evaluate additional criteria. For example, additional criteria, such as criteria based on multiple schema parts, can be evaluated at block 550 to determine whether threshold criteria for proceeding to block 560 is satisfied.

If the encrypted numeric value 254 is not less than the total number of possible values 222, the processing logic may perform a second encryption operation that encrypts the encrypted numeral string 524 using fixed-radix format-preserving encryption with the encryption key 252 (block 530). The processing logic may convert the resulting encrypted numeral string 524 to an encrypted numeral string 524 (block 540), and determine whether the encrypted numeric value 254 is less than the total number of possible values 222 (block 550). If the encrypted numeric value 254 is not less than the total number of possible values 222, the processing device may continue by performing the encryption again as described above (block 530 and subsequent blocks) one or more times, until the encrypted numeric value 254 is less than the total number of possible values 222 (block 550).

Eventually, an encrypted numeric value 254 less than the total number of possible values 222 is generated (block 530), and the processing logic may provide the encrypted numeric value 254 as output, e.g., to a Mixed-Radix Encrypted Output Generator 260 (block 560). An encrypted numeric value 254 less than the total number of possible values 222 is eventually generated by the fixed-radix format-preserving encryption algorithm. Each encryption corresponds to a permutation of the input (the input numeral string 522 in the first invocation, or the most recent encrypted numeral string 524 in subsequent invocations). A permutation can be divided into a set of cycles, and each cycle that begins in a subset of the set of cycles eventually returns to the subset.

As an example, a first invocation of FF1 (block 530) may be performed using a base of 10, a 256-bit AES key with bytes [DC, AD, D8, F0, 59, F4, CA, 00, 07, 59, 4E, 70, 7A, 97, 8C, C5, D1, E5, 5B, B9, 33, AF, 24, AF, 3E, 77, AD, 0F, 79, D6, 07, 8F] (in hexadecimal format), and the numeral string 522 is 1 2 1 2 1 4 6 6 6 (in decimal format) as input. The first invocation of FF1 may generate an encrypted numeral string 524 of 9 2 8 9 4 1 2 0 7, which represents the encrypted numeric value 254 (e.g., integer) value 928941207. The processing device determines that the encrypted numeric value 928941207 is greater than the total number of possible values 222 (888931098) (block 550), and invokes the FF1 algorithm again using the encrypted numeral string 9 2 8 9 4 1 2 0 7 as input. The second invocation of FF1 may generates the encrypted numeral string 6 5 9 8 8 1 9 3 2, which represents the encrypted numeric value 659,881,932. The processing device determines that the encrypted numeric value 659,881,932 is less than the total number of possible values 222 (888,931,098) (block 550), and provides the encrypted numeric value 659,881,932 as output (e.g., to the Mixed-Radix Encrypted Output Generator 260).

Figure 6:
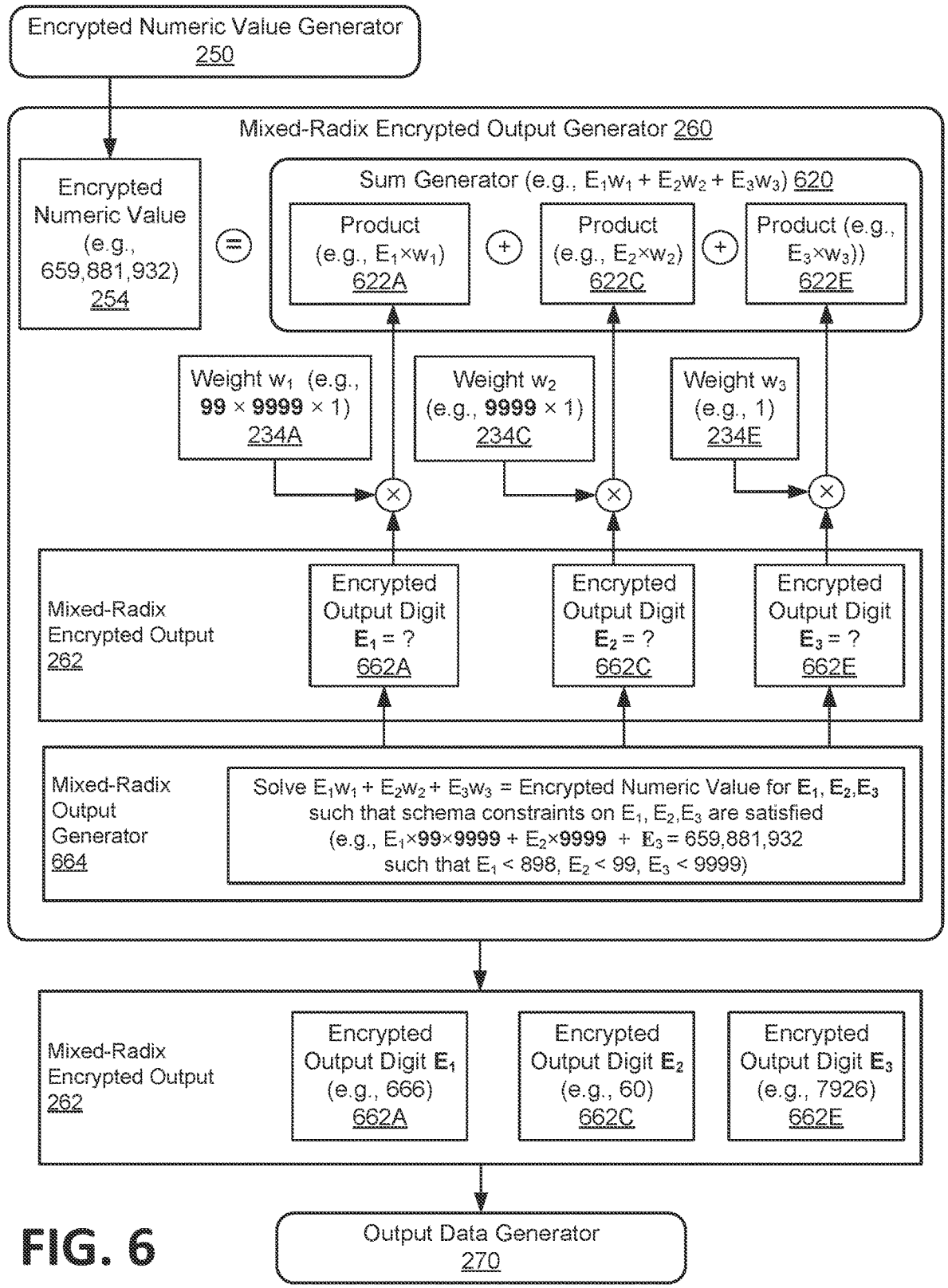
FIG. 6 illustrates an example Mixed-Radix Encrypted Output Generator in accordance with particular embodiments of the present disclosure.

FIG. 6 illustrates an example Mixed-Radix Encrypted Output Generator 260 in accordance with particular embodiments of the present disclosure. The Mixed-Radix Encrypted Output Generator 260 can receive an encrypted numeric value 254, e.g., from the Encrypted Numeric Value Generator 250 and transform the encrypted numeric value 254 to a mixed-radix encrypted output 262 using a reverse transformation that performs a reverse transformation that involves the reverse of the operations performed by the Intermediate Numeric Value Generator 246. That is, the Mixed-Radix Encrypted Output Generator 260 maps the encrypted numeric value 254 to a mixed-radix encrypted output 262 that includes a set of encrypted output digits 662 that conform to the data schema 202.

The Mixed-Radix Encrypted Output Generator 260 can identify the encrypted output digits 662 such that a sum of a linear combination of the output digits 662 corresponds to encrypted numeric value 254. In the linear combination, each of the output digits 662 is multiplied by the respective weight 234 (e.g., the weight 234 of the output part, or schema part, to which the output digit corresponds). The output digits values 662 can be determined by finding a set of output digit values 662 such that a weighted sum of the output digit values 662, in which each of the output digit values 662 is multiplied by the respective weight 234, equals the encrypted numeric value 254. Since each output digit value 662 is constrained to be less than the respective number of possible values 220, the output digit values 662 can be determined by, for example, calculating the weighted sum using combinations of output digit values 662 that are less than the respective numbers of possible values 220 until a solution is found.

The encrypted output digits 662A, 662C, 662E can be referred to as $E_1$, $E_2$, $E_3$, respectively, and correspond to the encryptable schema parts 304A, 304C, 304E, respectively. As an example, the Mixed-Radix Encrypted Output Generator 260 can transform the encrypted numeric value 659,881,932 to a set of encrypted output digits $E_1$, $E_2$, and $E_3$ by solving the equation $E_1 w_1 + E_2 w_2 + E_3 w_3 = 659,881,932$ for $E_1$, $E_2$, and $E_3$. The values of $w_1$, $w_2$, $w_3$ are the weights determined by the Mixed-Radix Weights Generator 232, so the equation is $E_1 \times 99 \times 9999 + E_2 \times 9999 + E_3 = 659,881,932$. The values of the encrypted output digits $E_1$, $E_2$, and $E_3$ are non-negative integers constrained by the numbers of possible values 220 of the schema parts, such that $E_1 < 898$, $E_2<99$, and $E_3<9999$. The Mixed-Radix Encrypted Output Generator 260 can calculate the values of the encrypted output digits using the equation and constraints. In this example, the values that satisfy the equation and constraints are $E_1=666$, $E_2=60$, and $E_3=7926$. The mixed-radix encrypted output 262 thus includes the encrypted output digits $E_1=666$, $E_2=60$, and $E_3=7926$. The Mixed-Radix Encrypted Output Generator 260 can provide the mixed-radix encrypted output 262 to the output data generator 270.

Figure 7:
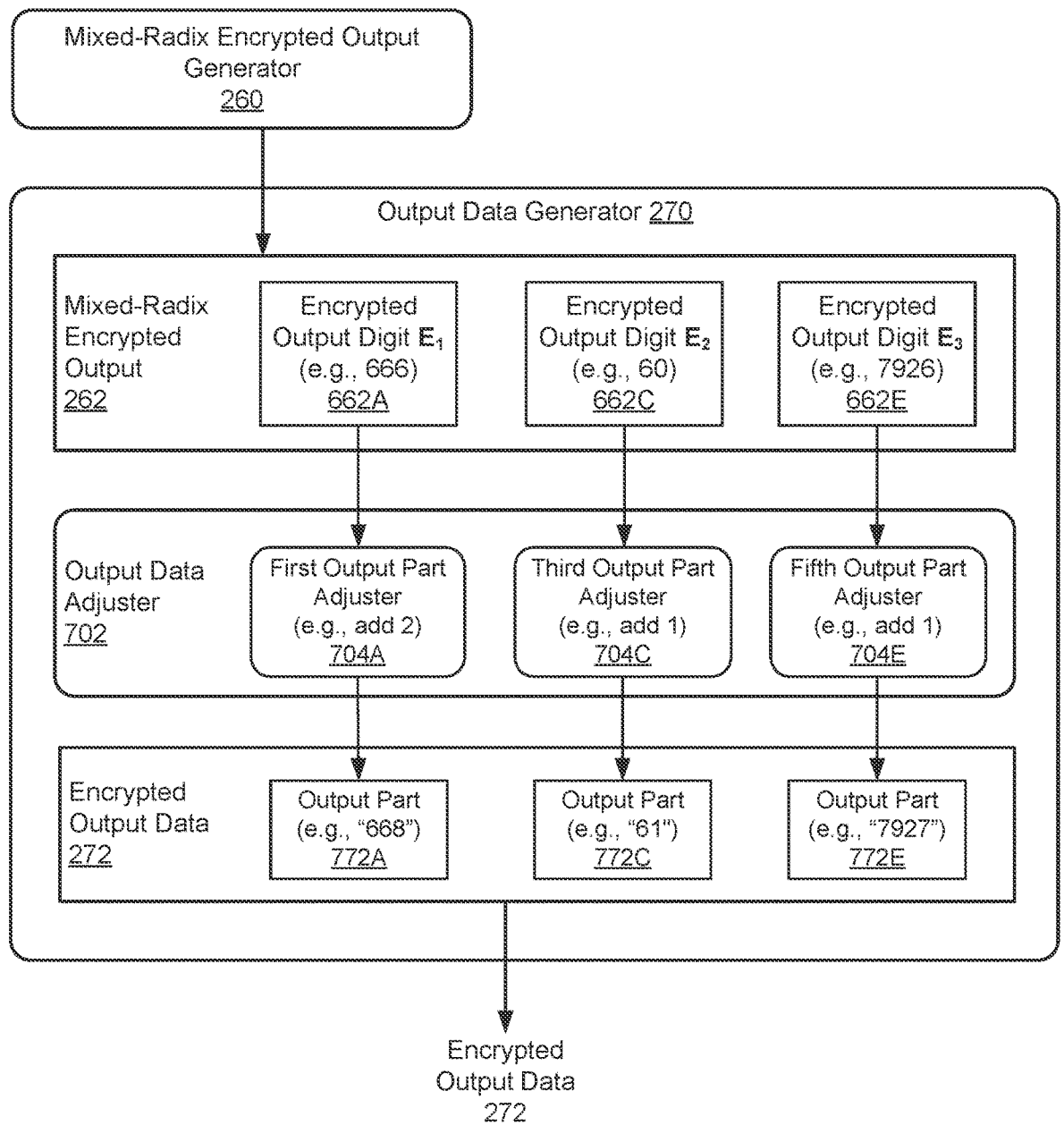
FIG. 7 illustrates an example Encrypted Output Data Generator in accordance with particular embodiments of the present disclosure.

FIG. 7 illustrates an example Encrypted Output Data Generator 270 in accordance with particular embodiments of the present disclosure. The Encrypted Output Data Generator 270 can receive a mixed-radix encrypted output 262 from the Mixed-Radix Encrypted Output Generator 260. The Encrypted Output Data Generator 270 can generate encrypted output data 272 that includes output parts 772 conforming to the data schema 202 by adjusting the value of each output digit 662 to reflect gaps, e.g., unused values corresponding to values prohibited by the schema, in the range of possible values between 0 and the value of the output digit 662. An Output Data Adjuster 702 adjusts the value of each encrypted output digit 662 as appropriate, and generates a respective output part 772 having the adjusted value, in the reverse of the transformation performed by the input data adjuster 450 described above with respect to FIG. 4A. As an example, the encrypted output digits 662A, 662C, 662E are 668, 61, and 7927, respectively. A first output part adjuster 704A adds 2 to the value of the encrypted output digit 662A because the value, 666, is greater than or equal to two values prohibited by the schema (0 and 666). The output part adjuster 704A thus sets the value of the first output part 772A to 666+2=668. A third output part adjuster 704C adds 1 to the value of the encrypted output digit 662C because the value, 60, is greater than one value prohibited by the schema (0). A fifth output part adjuster 704E adds 1 to the value of the encrypted output digit 662E because the value, 7926, is greater than one value prohibited by the schema (0). The resulting output parts 772A, 772C, 772E have the values 668, 61, 7927, respectively.

The encrypted output data 272 includes the output parts 772A, 772C, 772E and conforms to the data schema 202. The Encrypted Output Data Generator 270 can provide the encrypted output data 272 as output for use by applications, for example. Decryption of the encrypted output data 272 to recover the input data 242 can be performed similarly to the encryption operations described above, e.g., by transforming the encrypted output data 272 to mixed-radix input and transforming the mixed-radix input to an intermediate numeric value (similarly to the adjustment and transformation described above with respect to FIG. 4A), performing fixed-radix decryption on the intermediate numeric value using the encryption key 252 until the resulting decrypted numeric value is less than the total number of possible values 222 (similarly to the encryption operations described with respect to FIG. 5), generating mixed-radix decrypted output by identifying decrypted output digits that satisfy a weighted sum that equals the decrypted numeric value (similarly to the reverse transformation escribed with respect to FIG. 6), and adjusting the decrypted output digits (similarly to the adjustment described with respect to FIG. 7).

Figure 8:
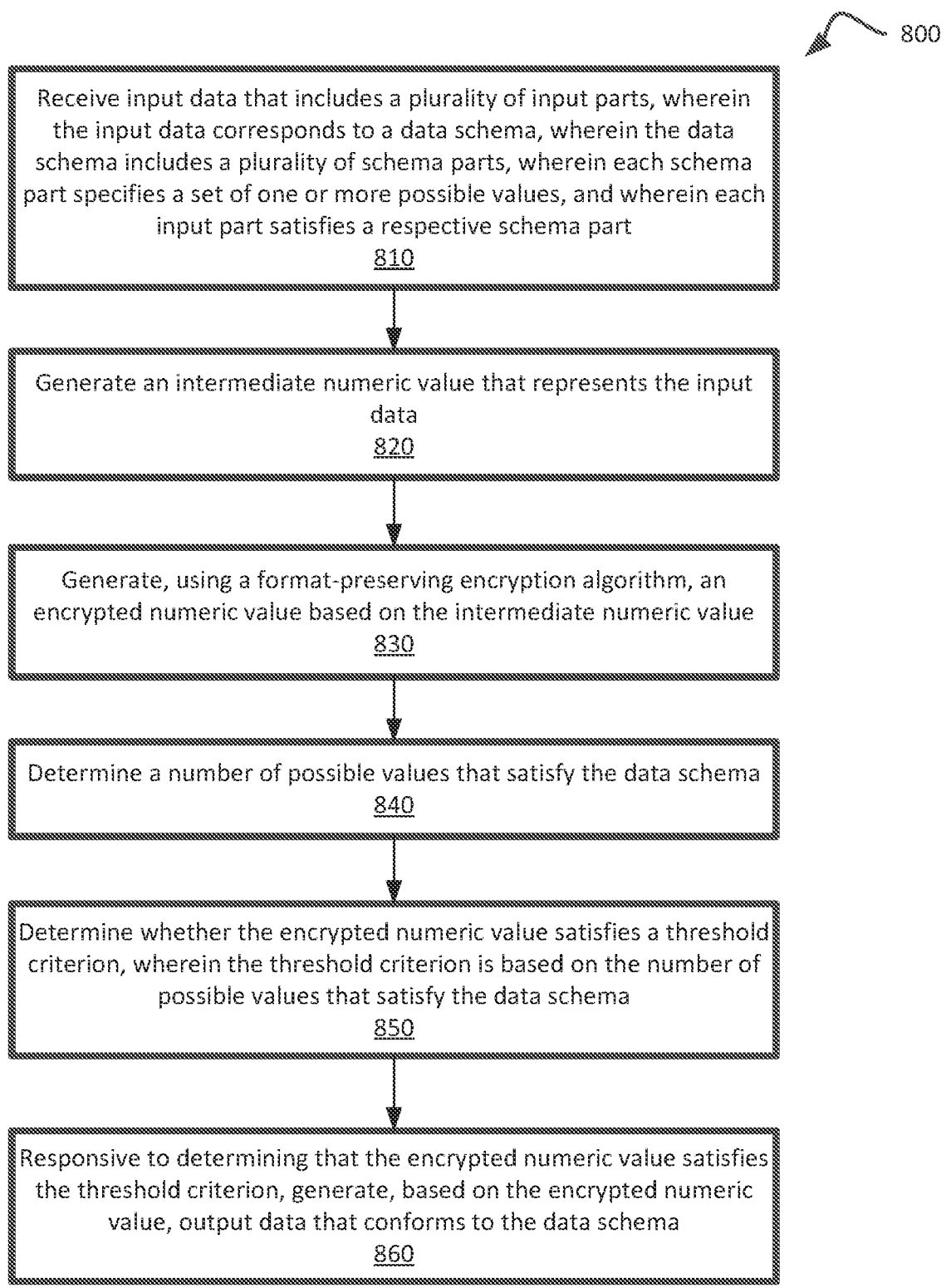
FIG. 8 is a flow diagram of an example method to perform format-preserving encryption of data in a complex data format in accordance with particular embodiments of the present disclosure.

FIG. 8 is a flow diagram of an example method 800 to perform format-preserving encryption of data in a complex data format in accordance with particular embodiments of the present disclosure.

In general, the method 800 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 500 may be performed by the format-preserving encryption system 200 of FIG. 2.

As shown in FIG. 8, the method 800 may begin with processing logic receiving input data that includes a plurality of input parts, wherein the input data corresponds to a data schema, wherein the data schema includes a plurality of schema parts. Each schema part specifies a set of one or more possible values, and each input part satisfies a respective schema part (block 810).

The processing logic may subsequently generate an intermediate numeric value that represents the input data (block 820). The processing logic may further generate, using a format-preserving encryption algorithm, an encrypted numeric value based on the intermediate numeric value (block 830). The processing logic may further determine a number of possible values that satisfy the data schema (block 840).

The processing logic may further determine whether the encrypted numeric value satisfies a threshold criterion, wherein the threshold criterion is based on the number of possible values that satisfy the data schema (block 850). The threshold criterion may be satisfied if, for example, the encrypted numeric value is less than a total number of possible values. Further, if an implementation wishes to include other constraints (such as constraints that apply to multiple schema parts), the processing logic may evaluate additional criteria as part of determining whether the encrypted numeric value satisfies the threshold criterion. The processing logic may further generate, based on the encrypted numeric value, output data that conforms to the data schema responsive to determining that the encrypted numeric value satisfies the threshold criterion (block 860).

Figure 9:
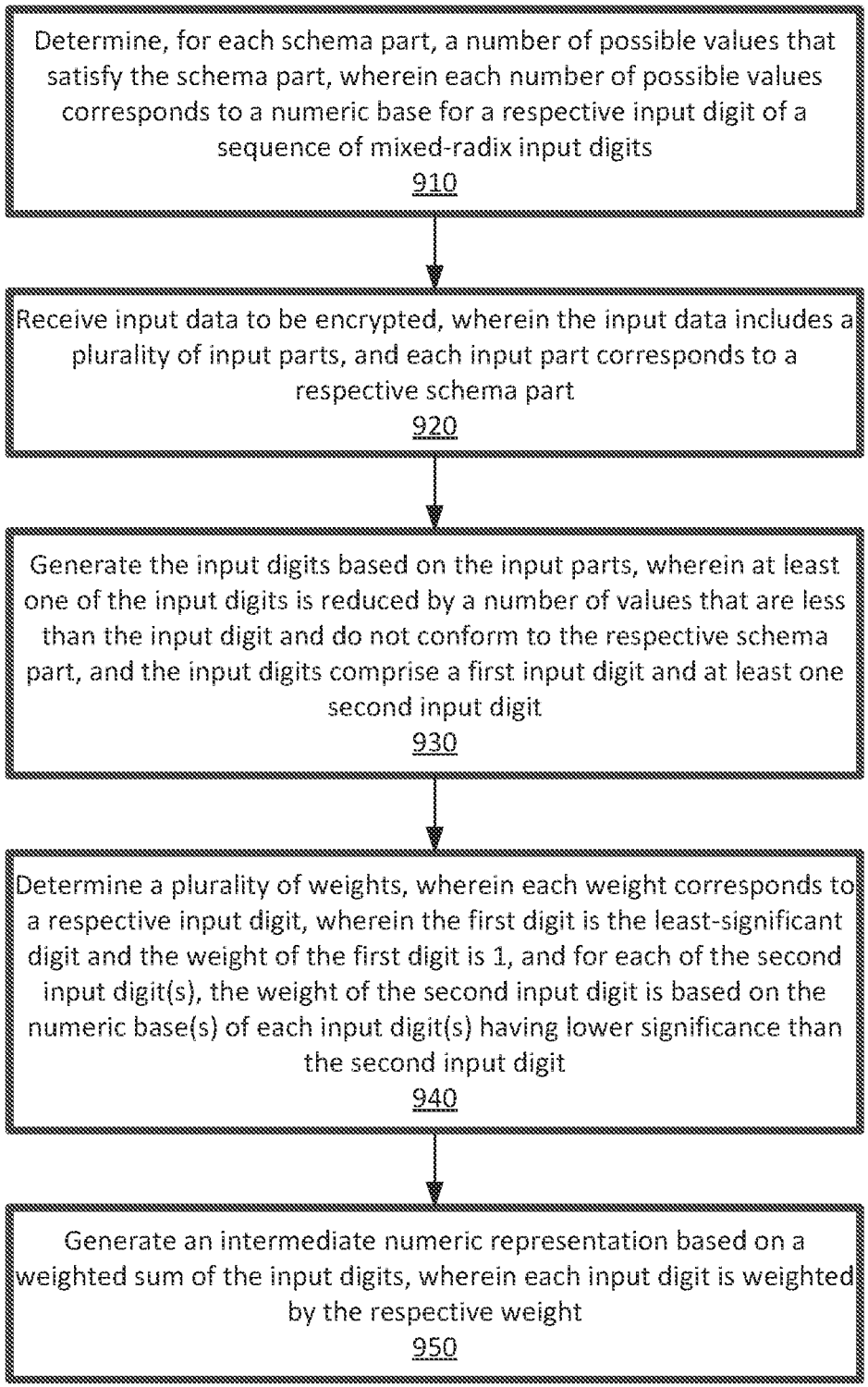
FIG. 9 is a flow diagram of an example method to generate an intermediate numeric representation of input data in accordance with particular embodiments of the present disclosure.

FIG. 9 is a flow diagram of an example method 900 to generate an intermediate numeric representation of input data in accordance with particular embodiments of the present disclosure.

In general, the method 900 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 500 may be performed by the format-preserving encryption system 200 of FIG. 2.

As shown in FIG. 9, the method 900 may begin with processing logic determining, for each schema part, a number of possible values that satisfy the schema part. Each number of possible values can correspond to a numeric base for a respective input digit of a sequence of mixed-radix input digits (block 910). The processing logic may subsequently receive input data to be encrypted. The input data can include a plurality of input parts, and each input part corresponds to a respective schema part (block 920). The processing logic may further generate the input digits based on the input parts. At least one of the input digits can be reduced by a number of values that are less than the input digit and do not conform to the respective schema part. The input digits can comprise a first input digit and at least one second input digit (block 930).

The processing logic may further determine a plurality of weights. Each weight can correspond to a respective input digit, such that the first digit is the least-significant digit and the weight of the first digit is 1. For each of the second input digit(s), the weight of the second input digit can be based on the numeric base(s) of each input digit(s) having lower significance than the second input digit (block 940). The processing logic may further generate an intermediate numeric representation based on a weighted sum of the input digits. In the weighted sum, each input digit can be weighted by the respective weight (block 950).

Figure 10:
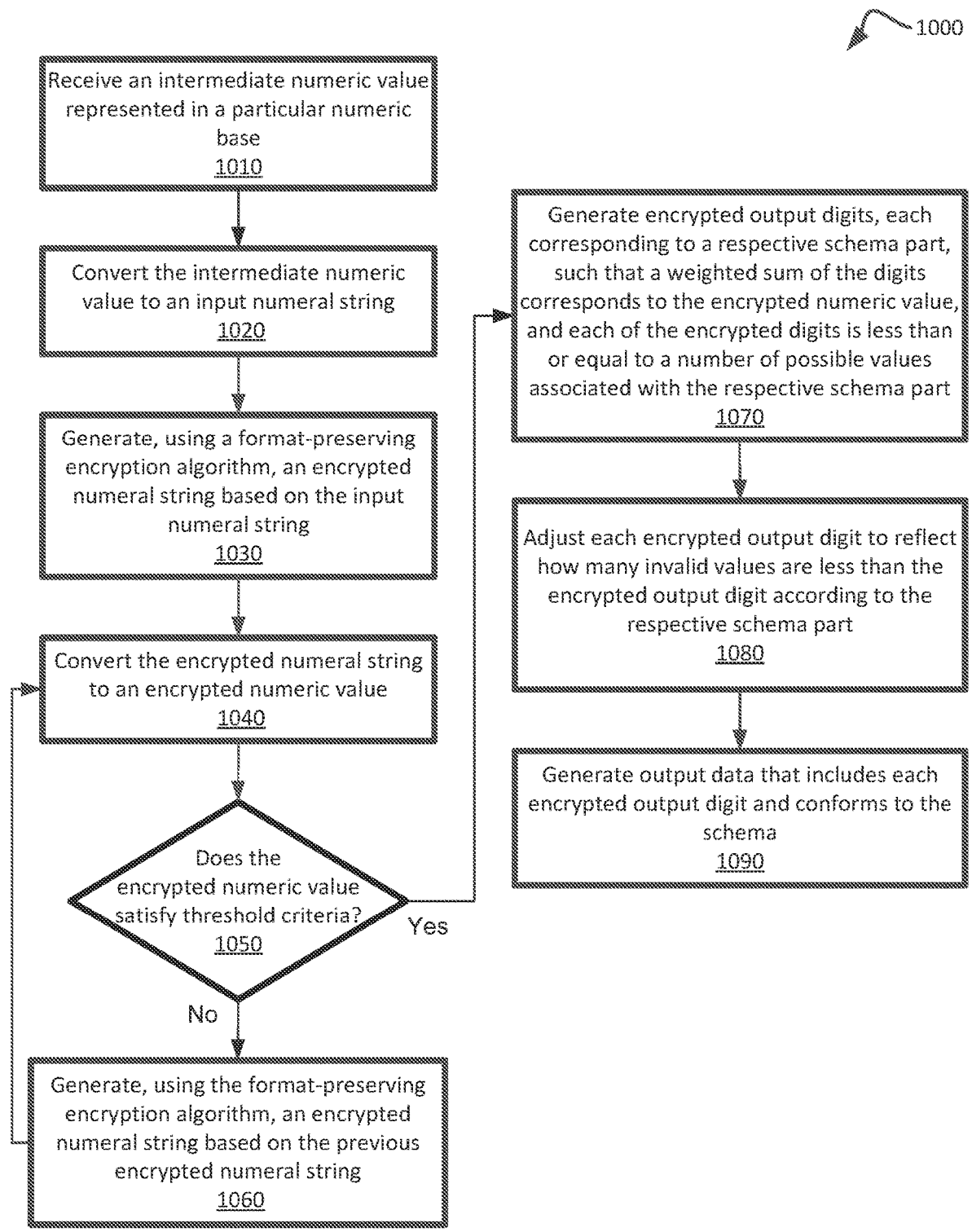
FIG. 10 is a flow diagram of an example method to encrypt an intermediate numeric value and transform the encrypted intermediate numeric value to output data that conforms to a data schema in accordance with some embodiments of the present disclosure.

FIG. 10 is a flow diagram of an example method 1000 to encrypt an intermediate numeric value and transform the encrypted intermediate numeric value to output data that conforms to a data schema in accordance with some embodiments of the present disclosure.

In general, the method 1000 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 500 may be performed by the format-preserving encryption system 200 of FIG. 2.

As shown in FIG. 10, the method 1000 may begin with processing logic receiving an intermediate numeric value represented in a particular numeric base (block 1010). The processing logic may subsequently convert the intermediate numeric value to an input numeral string (block 1020). The input numeral string can be an array of numbers in a particular base. For example, the input numeral string can be an array of base-10 integers.

The processing logic may further generate, using a format-preserving encryption algorithm, an encrypted numeral string based on the input numeral string (block 1030). The processing logic may further convert the encrypted numeral string to an encrypted numeric value (block 1040), e.g., as a weighted sum of the integer array values, in which each array value is multiplied by the numeric base (e.g., 10) raised to a power that corresponds to the position of the array value in the array.

The processing logic may further determine whether the encrypted numeric value satisfies one or more threshold criteria (block 1050). For example, the threshold criteria may be that the encrypted numeric value is less than a total number of possible values 222. If the encrypted numeric value does not satisfy the threshold criteria, then the processing logic may perform another invocation of the encryption algorithm on the "previous" encrypted numeral string (which does not satisfy the threshold criteria) by generating, using the format-preserving encryption algorithm, an encrypted numeral string based on the previous encrypted numeral string (block 1060), converting the encrypted numeral string to an encrypted numeric value (block 1040), and determining whether the encrypted numeric value satisfies the threshold criteria (block 1050). The processing logic may repeat those operations (blocks 1060, 1040, and 1050) until the encrypted numeric value satisfies the threshold criteria, at which point the processing logic may further generate encrypted output digits, each corresponding to a respective schema part, such that a weighted sum of the digits corresponds to the encrypted numeric value, and each of the encrypted digits is less than a number of possible values associated with the respective schema part (block 1070).

The processing logic may further adjust each encrypted output digit to reflect how many invalid values are less than the encrypted output digit according to the respective schema part (block 1080). For example, the processing logic may increase the value of each encrypted output digit by the number of invalid values that are less than the encrypted output digit according to the respective schema part. The processing logic may further generate output data that includes each encrypted output digit and conforms to the schema (block 1090).

Figure 11:
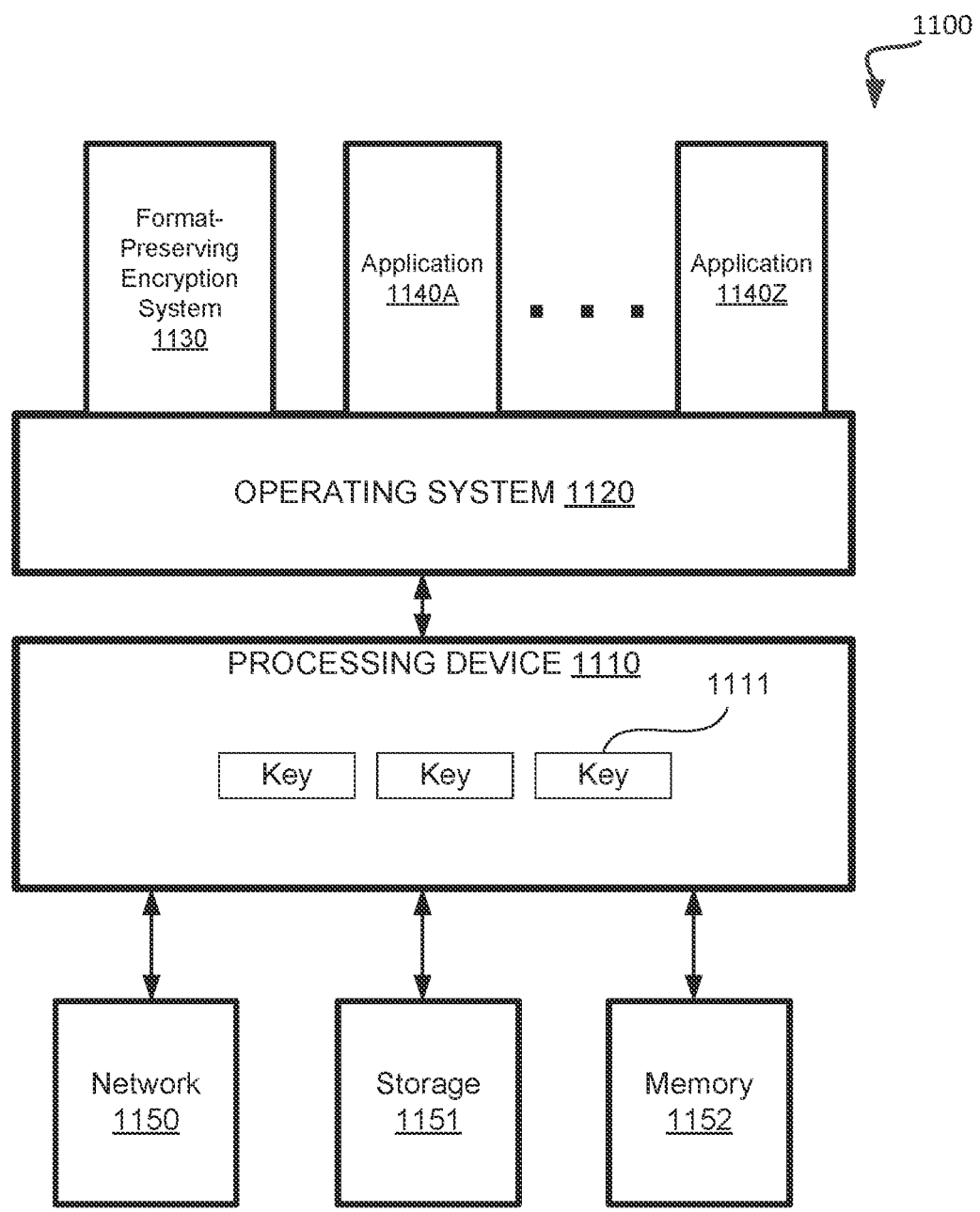
FIG. 11 illustrates an example network server with a format-preserving encryption system to execute an application in accordance with particular embodiments of the present disclosure.

FIG. 11 illustrates an example network server 1100 with a format-preserving encryption system 1130 to execute an application in accordance with particular embodiments of the present disclosure. In general, a format-preserving encryption system 1130 may be hosted by a network server along with one or more other applications 1140A to 1140Z that are also hosted by the network server or another network server. The format-preserving encryption system 1130 may correspond to the format-preserving encryption system 200 of FIG. 2.

As shown in FIG. 11, the network server 1100 may include a processing device 1110 that may execute an operating system 1120. Furthermore, the processing device 1110 may include one or more internal cryptographic keys 1111 that may be used to encrypt and decrypt data stored in a portion of a memory that is assigned to a secure enclave. Access to the data in the secure enclave may be protected from the one or more applications 1140A to 1140Z and the operating system 1120. For example, the access to the data of the secure enclave may be protected by the use of one of the internal cryptographic keys 1111 that are internal to the processing device 1110 so that the access to the data is based on a hardware access as opposed to a software access. The operating system 1120 may be associated with a first privilege level and the applications 1140A to 1140Z may be associated with a second privilege level where the first privilege level of the operating system is more privileged than the second privilege level of the various applications that are run on the operating system 1120 (e.g., the more privileged level allows access to more resources of the network server than the less privileged level). Thus, the operating system 1120 may be allowed access to resources of the applications 1140A to 1140Z.

In operation, the format-preserving encryption system 1130 may be hosted on the network server 1100. A, the data may be securely (e.g., encrypted) stored in the storage 1151 or memory 1152 associated with the processing device 1110 or at another storage resource over a network 1150.

Figure 12:
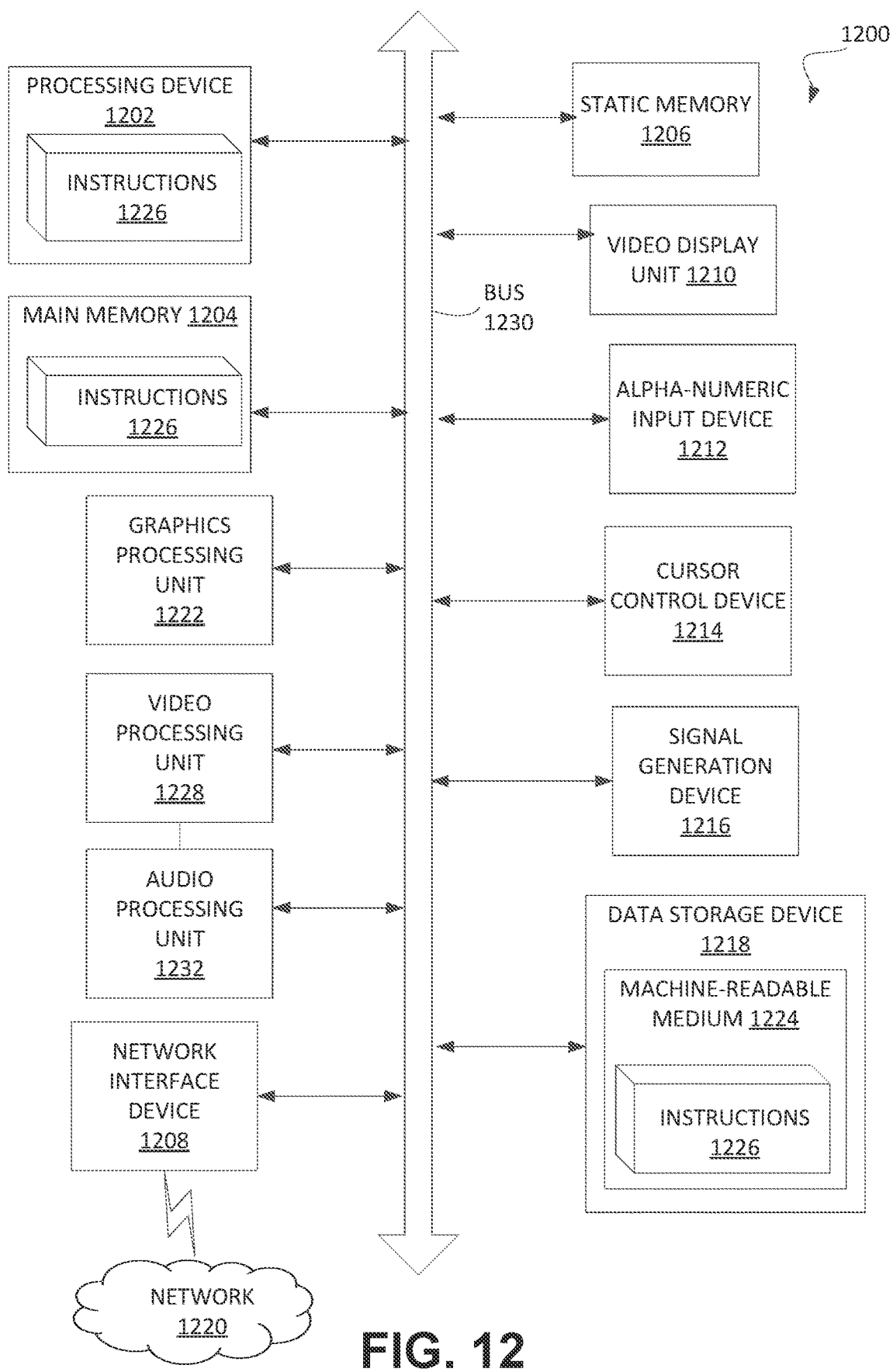
FIG. 12 illustrates an example computer system in which embodiments of the present disclosure operate.

FIG. 12 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a computer-readable medium) on which is stored one or more sets of instructions or software 1226 embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In one implementation, the instructions 1226 include instructions to implement functionality corresponding format-preserving encryption. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving, at a computing device, input data that includes a plurality of input parts, wherein the input data corresponds to a data schema, wherein the data schema includes a plurality of schema parts, wherein each schema part specifies a set of one or more possible values, and wherein each input part satisfies a respective schema part;
   generating an intermediate numeric value using a plurality of input digits that represent the input data, wherein the intermediate numeric value is based on a weighted sum of the plurality of input digits in accordance with a determined weight of each input digit;
   generating, using a format-preserving encryption algorithm, an encrypted numeric value based on the intermediate numeric value;
   determining a number of possible values that satisfy the data schema;
   determining whether the encrypted numeric value satisfies a threshold criterion, wherein the threshold criterion is based on the number of possible values that satisfy the data schema; and
   responsive to determining that the encrypted numeric value satisfies the threshold criterion, generating, based on the encrypted numeric value, output data that conforms to the data schema, wherein generating the output data comprises:
   determining a plurality of encrypted digits, wherein each encrypted digit corresponds to a respective schema part, wherein a weighted sum of the encrypted digits corresponds to the encrypted numeric value, and each of the encrypted digits satisfies a constraint associated with the respective schema part; and
   generating a plurality of output parts, wherein each output part conforms to a respective schema part and is based on the encrypted digit that corresponds to the respective schema part, wherein the output data comprises the plurality of output parts.

2. The method of claim 1, wherein each input part satisfies the respective schema part if the input part is in the set of one or more possible values specified by the respective schema part.

3. The method of claim 1, wherein each input digit of the plurality of input digits is based on a respective input part and further based on one or more constraints associated with the respective schema part.

4. The method of claim 3, wherein the at least one of the plurality of input digits is reduced by an amount based on a number of data values that do not satisfy the respective schema part, wherein the number of data values that do not satisfy the respective schema part is determined based on the one or more constraints associated with the respective schema part.

5. The method of claim 3, wherein the plurality of input digits comprise a first input digit and at least one second input digit, wherein the first input digit is the least-significant of the input digits, and wherein the determined weight of each of the at least one second input digits is based on a product of a number of possible values associated with a respective adjacent digit by the data schema and the determined weight associated with the respective adjacent digit.

6. The method of claim 5, wherein the number of possible values associated with each of the input digits includes a respective number of possible values that satisfy the respective schema part.

7. The method of claim 5, wherein the respective adjacent digit is at an adjacent and less-significant position than the second input digit.

8. The method of claim 1, wherein at least two of the schema parts specify different sets of possible values.

9. The method of claim 1, wherein the format-preserving encryption algorithm encrypts data represented in a single numeric base.

10. The method of claim 9, wherein the intermediate numeric value is represented in a particular numeric base, wherein the particular numeric base is provided to the format-preserving encryption algorithm, and wherein the encrypted numeric value generated by the format-preserving encryption algorithm is represented in the particular numeric base.

11. The method of claim 1, wherein generating, using the format-preserving encryption algorithm, the encrypted numeric value comprises:
   generating, based on the intermediate numeric value, a numeral string comprising a sequence of numerals, wherein each of the numerals is represented in a particular numeric base;
   encrypting the numeral string using the format-preserving encryption algorithm, wherein the format-preserving encryption algorithm generates an encrypted numeral string represented in the particular numeric base; and
   generating the encrypted numeric value based on the encrypted numeral string.

12. The method of claim 1, wherein the threshold criterion is satisfied if the encrypted numeric value is less than to the number of possible values that satisfy the data schema.

13. The method of claim 1, wherein the number of possible values that satisfy the data schema is determined based on a plurality of numbers of data values, wherein the plurality of numbers of data values includes, for each of the schema parts, a respective number of possible values that satisfy the respective schema part.

14. The method of claim 12, wherein the number of possible values that satisfy the data schema is determined as a product of the numbers of data values.

15. The method of claim 12, wherein each respective number of possible values that satisfy the respective schema part is based on one or more constraints associated with the respective schema part, wherein each of the one or more constraints specifies which data values satisfy the respective schema part.

16. The method of claim 14, wherein each constraint comprises one or more of: an upper bound, a lower bound, or one or more excluded values.

17. The method of claim 1, further comprising:
   responsive to determining that the encrypted numeric value does not satisfy the threshold criterion, performing one or more subsequent invocations of the format-preserving encryption algorithm until the encrypted numeric value generated by a subsequent invocation satisfies the threshold criterion,
   wherein performing the one or more subsequent invocations comprises, for each subsequent invocation, encrypting the encrypted numeric value generated by a previous invocation of the format-preserving encryption algorithm.

18. A system comprising:

a memory; and a processing device, operatively coupled with the memory, to:

receive, at a computing device, input data that includes a plurality of input parts, wherein the input data corresponds to a data schema, wherein the data schema includes a plurality of schema parts, wherein each schema part specifies a set of one or more possible values, and wherein each input part satisfies a respective schema part;

generate an intermediate numeric value using a plurality of input digits that represent the input data, wherein the intermediate numeric value is based on a weighted sum of the plurality of input digits in accordance with a determined weight of each input digit;

generate, using a format-preserving encryption algorithm, an encrypted numeric value based on the intermediate numeric value;

determine a number of possible values that satisfy the data schema;

determine whether the encrypted numeric value satisfies a threshold criterion, wherein the threshold criterion is based on the number of possible values that satisfy the data schema; and responsive to determining that the encrypted numeric value satisfies the threshold criterion, generate, based on the encrypted numeric value, output data that conforms to the data schema, wherein generating the output data comprises:

determining a plurality of encrypted digits, wherein each encrypted digit corresponds to a respective schema part, wherein a weighted sum of the encrypted digits corresponds to the encrypted numeric value, and each of the encrypted digits satisfies a constraint associated with the respective schema part; and generating a plurality of output parts, wherein each output part conforms to a respective schema part and is based on the encrypted digit that corresponds to the respective schema part, wherein the output data comprises the plurality of output parts.

19. A non-transitory computer readable medium comprising data that, when accessed by a processing device, cause the processing device to perform operations comprising:

receiving, at a computing device, input data that includes a plurality of input parts, wherein the input data corresponds to a data schema, wherein the data schema includes a plurality of schema parts, wherein each schema part specifies a set of one or more possible values, and wherein each input part satisfies a respective schema part;

generating an intermediate numeric value using a plurality of input digits that represent the input data, wherein the intermediate numeric value is based on a weighted sum of the plurality of input digits in accordance with a determined weight of each input digit;

generating, using a format-preserving encryption algorithm, an encrypted numeric value based on the intermediate numeric value;

determining a number of possible values that satisfy the data schema;

determining whether the encrypted numeric value satisfies a threshold criterion, wherein the threshold criterion is based on the number of possible values that satisfy the data schema; and responsive to determining that the encrypted numeric value satisfies the threshold criterion, generating, based on the encrypted numeric value, output data that conforms to the data schema, wherein generating the output data comprises:

determining a plurality of encrypted digits, wherein each encrypted digit corresponds to a respective schema part, wherein a weighted sum of the encrypted digits corresponds to the encrypted numeric value, and each of the encrypted digits satisfies a constraint associated with the respective schema part; and generating a plurality of output parts, wherein each output part conforms to a respective schema part and is based on the encrypted digit that corresponds to the respective schema part, wherein the output data comprises the plurality of output parts.

\* \* \* \* \*